US 11,681,194 B2

(12) United States Patent
Shipton et al.

(10) Patent No.: US 11,681,194 B2
(45) Date of Patent: *Jun. 20, 2023

(54) MAGNETIC FIELD DRIVEN LIQUID CRYSTAL PATTERNING CONTROL SYSTEM

(71) Applicant: META PLATFORMS TECHNOLOGIES, LLC, Menlo Park, CA (US)

(72) Inventors: Erik Shipton, Kenmore, WA (US); Oleg Yaroshchuk, Redmond, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/671,449

(22) Filed: Feb. 14, 2022

(65) Prior Publication Data

US 2022/0171232 A1   Jun. 2, 2022

Related U.S. Application Data

(63) Continuation of application No. 16/561,258, filed on Sep. 5, 2019, now Pat. No. 11,249,365.

(51) Int. Cl.
*G02F 1/137* (2006.01)
*G02B 27/01* (2006.01)
*G02F 1/1337* (2006.01)

(52) U.S. Cl.
CPC ..... *G02F 1/13768* (2013.01); *G02B 27/0172* (2013.01); *G02F 1/1337* (2013.01); *G02B 2027/0178* (2013.01)

(58) Field of Classification Search
CPC ............... G02F 1/1337; G02F 1/13768; G02B 27/0172; G02B 2027/0178
(Continued)

(56) References Cited

U.S. PATENT DOCUMENTS 3,602,908 A   8/1971   Oshima et al.
4,783,150 A   11/1988  Tabony
(Continued)

OTHER PUBLICATIONS

International Preliminary Report on Patentability for International Application No. PCT/US2020/045231, dated Mar. 17, 2022, 8 pages.
(Continued)

*Primary Examiner* — Edward J Glick
*Assistant Examiner* — David Y Chung
(74) *Attorney, Agent, or Firm* — Artegis Law Group, LLP

(57) ABSTRACT

Various embodiments set forth liquid crystal (LC) patterning control systems in which LCs are aligned using locally applied magnetic fields. The index of refraction experienced by light propagating through an anisotropic LC is dependent on orientation. As a result, a phase difference may be imparted to an optical beam that is passed through, or reflected from, an array of LCs whose orientations are controlled via locally applied magnetic fields. In some embodiments, the locally applied magnetic fields may be generated by driving currents through wires that intersect at micro or nanomagnetic particles or at magnetic domains, or by applying voltages to micro or nanocoils wrapped around high-permeability cores, among other things.

18 Claims, 17 Drawing Sheets

(58) Field of Classification Search
USPC .......................................................... 349/23
See application file for complete search history.

(56) References Cited

U.S. PATENT DOCUMENTS

| | | |
|---|---|---|
| 6,243,082 B1 | 6/2001 | Konishi |
| 7,071,686 B1 | 7/2006 | Burns |
| 8,194,196 B2 | 6/2012 | Lee et al. |
| 11,249,365 B2 * | 2/2022 | Shipton ............... G02F 1/13768 |
| 2002/0084442 A1 | 7/2002 | Yasuda et al. |
| 2005/0157227 A1 | 7/2005 | Hashimoto |
| 2008/0304893 A1 | 12/2008 | Picqueur et al. |
| 2009/0153942 A1 | 6/2009 | Daniel et al. |
| 2018/0045986 A1 | 2/2018 | Chen et al. |
| 2019/0212482 A1 | 7/2019 | Richards |
| 2019/0227322 A1 | 7/2019 | Schaub et al. |

OTHER PUBLICATIONS

Abari R., "Introduction to Magnetic Materials," Second Edition, IEEE Press, John Wiley & Sons, Inc., Publication, Philadelphia, Pennsylvania, May 2008, 549 Pages.
Bahadur B., "Liquid Crystals—Applications and Uses," Worid Scientific Publishing Corporation, 1990, vol. 1, 26 Pages.
International Search Report and Written Opinion for International Application No. PCT/US2020/045231, dated Oct. 23, 2020, 10 Pages.
Pieranski P., et al., "Static and Dynamic Behavior of a Nematic Liquid Crystal in a Magnetic Field. Part II: Dynamics," HAL Archives-Ouvertes, Journal De Physique, Jan. 1, 1973, vol. 34 (1), 15 Pages.

* cited by examiner

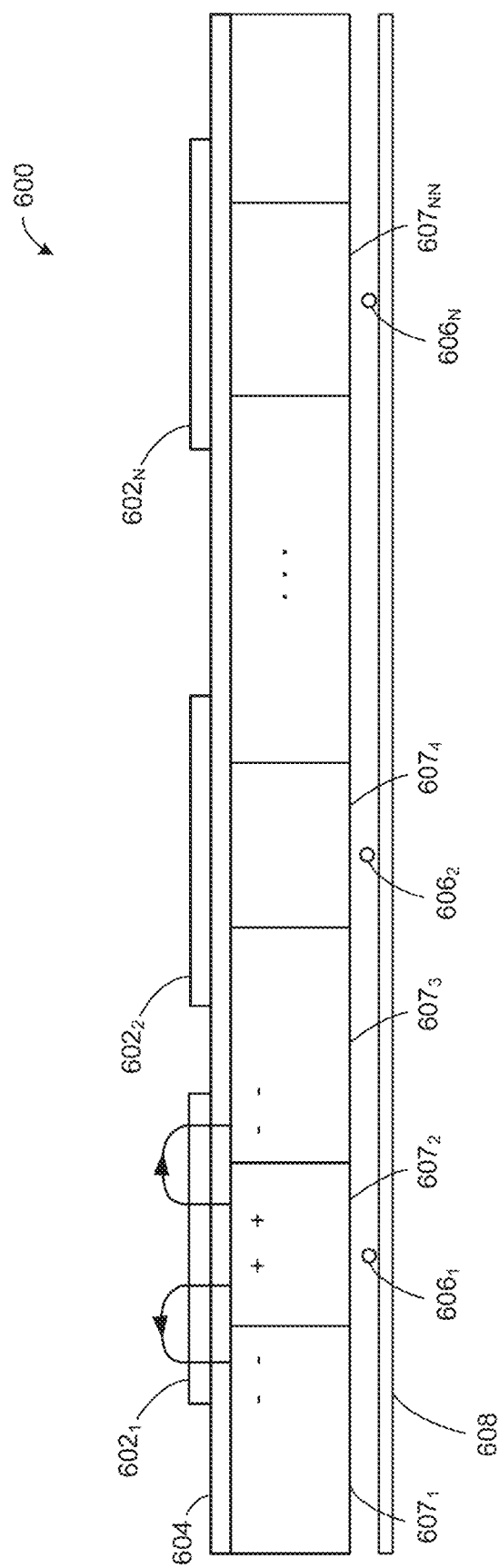

MAGNETIC FIELD DRIVEN LIQUID CRYSTAL PATTERNING CONTROL SYSTEM

CROSS-REFERENCE TO RELATED APPLICATIONS

This application is a continuation of U.S. patent application titled, "MAGNETIC FIELD DRIVEN LIQUID CRYSTAL PATTERNING CONTROL SYSTEM," filed on Sep. 5, 2019, and having Ser. No. 16/561,258. The subject matter of this related application is hereby incorporated herein by reference.

BACKGROUND

Field of the Various Embodiments

Embodiments of this disclosure relate generally to optical systems and, more specifically, to liquid crystal patterning control systems.

Description of the Related Art

Various liquid crystal (LC) devices use electric fields to reorient anisotropic LC molecules. In such devices, a LC in each LC cell, corresponding to a pixel, is controlled by a locally applied electric field.

Stray electric fields from electronics tend to distort the alignment of LCs in traditional LC devices, limiting the smallest pixel sizes of such devices. The performance of traditional LC devices can also degrade over time due to ionic shielding, in which the electric fields applied to reorient LC molecules are affected by the buildup of electric fields from ion impurities within the LC itself. Such ion impurities may be produced by, e.g., ultraviolet light breaking down the LC into ions. In addition, continuous power dissipation is required to maintain the electric fields needed to align LC molecules in traditional LC devices.

SUMMARY

One embodiment of the present disclosure sets forth a liquid crystal patterning control system including a plurality of pixels. Each of the pixels includes a liquid crystal and a magnet. Responsive to a switching of the magnet, molecules of the liquid crystal reorient to substantially align with a magnetic field generated by the magnet.

Another embodiment of the present disclosure sets forth a cell that includes a birefringent material and at least one alignment layer disposed adjacent to the birefringent material. Reorientation of molecules in the birefringent material is driven by a magnet.

Another embodiment of the present disclosure sets forth a method for modulating light. The method includes determining states of a plurality of pixels for at least one point in time. The method further includes driving liquid crystals associated with the pixels using magnetic fields, based on the determined states of the pixels. In addition, the method includes projecting light that passes through the liquid crystals.

One advantage of the liquid crystal patterning control systems disclosed herein is that the use of magnetic, rather than electric, fields to align liquid crystals permits pixel sizes to be reduced to below the limit of traditional liquid crystal devices. For example, the pixel sizes of embodiments may be smaller than ~1 µm, such as ~100 nm. The liquid crystal patterning control systems disclosed herein are also not affected by ionic shielding. In addition, the magnetization of anisotropic magnets may be fixed after such magnets are switched, allowing liquid crystals to remain aligned with magnetic fields produced by those magnets without power dissipation. These technical advantages represent one or more technological advancements over prior art approaches.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

FIG. 6A is a schematic diagram illustrating a cross-section view of another LC patterning control system, according to various embodiments.

DETAILED DESCRIPTION

In the following description, numerous specific details are set forth to provide a more thorough understanding of the various embodiments. However, it is apparent to one of skilled in the art that the disclosed concepts may be practiced without one or more of these specific details.

Configuration Overview

One or more embodiments disclosed herein relate to liquid crystal (LC) patterning control systems in which LCs are aligned using locally applied magnetic fields. The index of refraction experienced by light propagating through an anisotropic LC is dependent on orientation. As a result, a phase difference may be imparted to an optical beam that is passed through, or reflected from, an array of LCs whose orientations are controlled via locally applied magnetic fields. In some embodiments, the locally applied magnetic fields may be generated by, e.g., driving currents through wires that intersect at micro or nanomagnetic particles or at magnetic domains, or by applying voltages to micro or nanocoils wrapped around high-permeability cores. Further, the LC patterning control systems disclosed herein may be used as spatial light modulators, Pancharatnam-Berry phase (PBP) lenses, liquid crystal display (LCD) screens, varifocal lenses, and in holography (e.g., polarization volume holograms, point source holograms, Fourier transform holograms, or other computer-generated holograms), among other things.

Embodiments of the disclosure may also include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) connected to a host computer system, a standalone HMD, a mobile device or computing system, or any other hardware platform capable of providing artificial reality content to one or more viewers.

System Overview

Figure 1A:
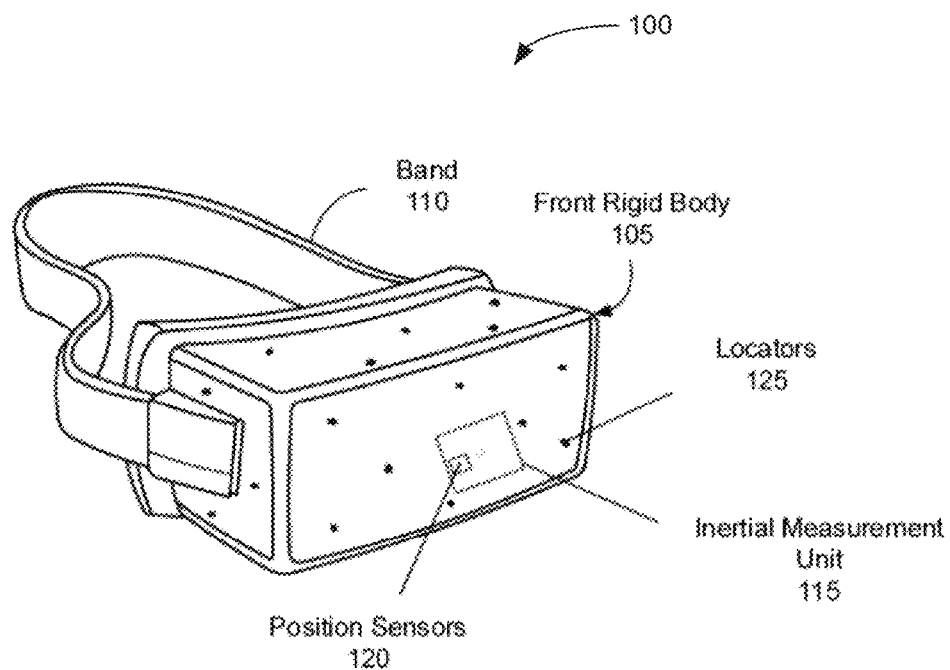
FIG. 1A is a diagram of a near eye display (NED), according to various embodiments.

FIG. 1A is a wire diagram of a near eye display (NED) 100, according to various embodiments. Although NEDs and head mounted displays (HMDs) are disclosed herein as reference examples, display devices that include liquid crystal (LC) patterning control systems in which LCs are aligned using locally applied magnetic fields may also be configured for placement in proximity of an eye or eyes of the user at a fixed location, without being head-mounted (e.g., the display device may be mounted in a vehicle, such as a car or an airplane, for placement in front of an eye or eyes of the user).

As shown, the NED 100 includes a front rigid body 105 and a band 110. The front rigid body 105 includes one or more electronic display elements of an electronic display (not shown), an inertial measurement unit (IMU) 115, one or more position sensors 120, and locators 125. As illustrated in FIG. 1A, position sensors 120 are located within the IMU 115, and neither the IMU 115 nor the position sensors 120 are visible to the user. In various embodiments, where the NED 100 acts as an AR or MR device, portions of the NED 100 and/or its internal components are at least partially transparent.

Figure 1B:
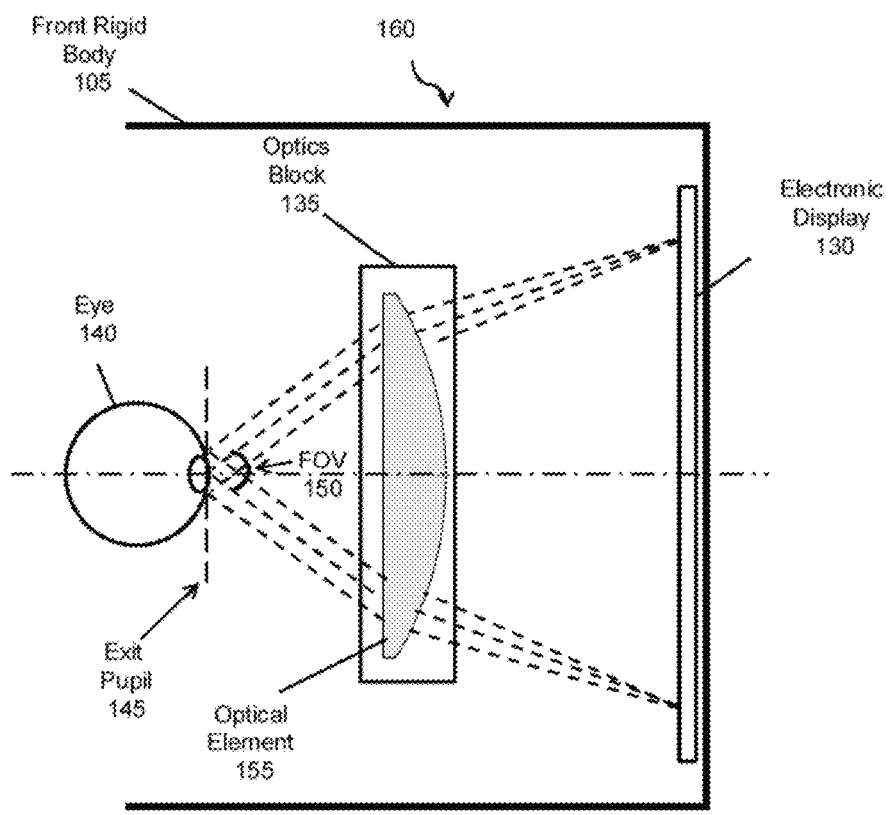
FIG. 1B is a cross section of the front rigid body of the embodiments of the NED illustrated in FIG. 1A.

FIG. 1B is a cross section 160 of the front rigid body 105 of the embodiments of the NED 100 illustrated in FIG. 1A. As shown, the front rigid body 105 includes an electronic display 130 and an optics block 135 that together provide image light to an exit pupil 145. The exit pupil 145 is the location of the front rigid body 105 where a user's eye 140 may be positioned. For purposes of illustration, FIG. 1B illustrates a cross section 160 associated with a single eye 140, but another optics block, separate from the optics block 135, may provide altered image light to another eye of the user. Additionally, the NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

The electronic display 130 displays images to the user. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode display (AMOLED), a QOLED, a QLED, some other display, or some combination thereof.

The optics block 135 adjusts an orientation of image light emitted from the electronic display 130 such that the electronic display 130 appears at particular virtual image distances from the user. The optics block 135 is configured to receive image light emitted from the electronic display 130 and direct the image light to an eye-box associated with the exit pupil 145. The image light directed to the eye-box forms an image at a retina of eye 140. The eye-box is a region defining how much the eye 140 moves up/down/left/right from without significant degradation in the image quality. In the illustration of FIG. 1B, a field of view (FOV) 150 is the extent of the observable world that is seen by the eye 140 at any given moment.

Additionally, in some embodiments, the optics block 135 magnifies received light, corrects optical errors associated with the image light, and presents the corrected image light to the eye 140. The optics block 135 may include one or more optical elements 155 in optical series. An optical element 155 may be an aperture, a Fresnel lens, a convex lens, a concave lens, a filter, a waveguide, a PBP lens or grating, a color-selective filter, a waveplate, a C-plate, or any other suitable optical element 155 that affects the image light. Moreover, the optics block 135 may include combinations of different optical elements. One or more of the optical elements in the optics block 135 may have one or more coatings, such as anti-reflective coatings. In some embodiments, the optics block 135 may include one or more of the LC patterning control systems discussed in detail below in conjunction with FIGS. 4-12.

Figure 2A:
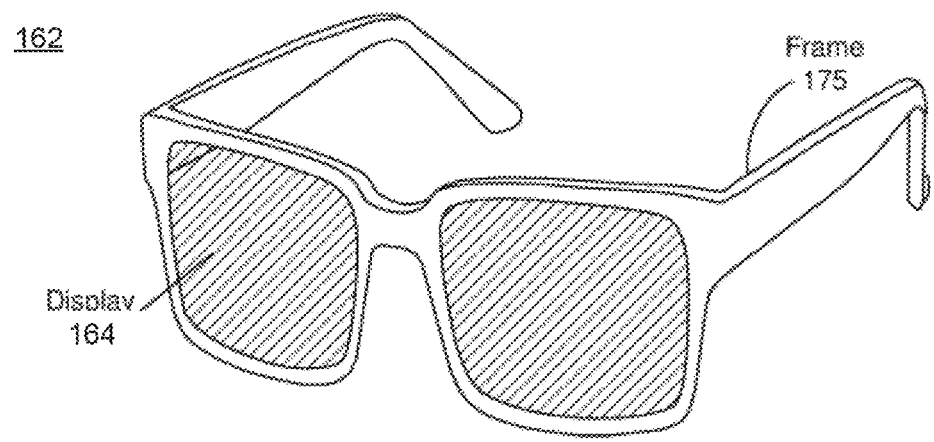
FIG. 2A is a diagram of a head-mounted display (HMD) implemented as a NED, according to various embodiments.

FIG. 2A is a diagram of an HMD 162 implemented as a NED, according to various embodiments. As shown, the HMD 162 is in the form of a pair of augmented reality glasses. The HMD 162 presents computer-generated media to a user and augments views of a physical, real-world environment with the computer-generated media. Examples of computer-generated media presented by the HMD 162 include one or more images, video, audio, or some combination thereof. In some embodiments, audio is presented via an external device (e.g., speakers and headphones) that receives audio information from the HMD 162, a console (not shown), or both, and presents audio data based on audio information. In some embodiments, the HMD 162 may be modified to also operate as a virtual reality (VR) HMD, a mixed reality (MR) HMD, or some combination thereof. The HMD 162 includes a frame 175 and a display 164. As shown, the frame 175 mounts the near eye display to the user's head, while the display 164 provides image light to the user. The display 164 may be customized to a variety of shapes and sizes to conform to different styles of eyeglass frames.

Figure 2B:
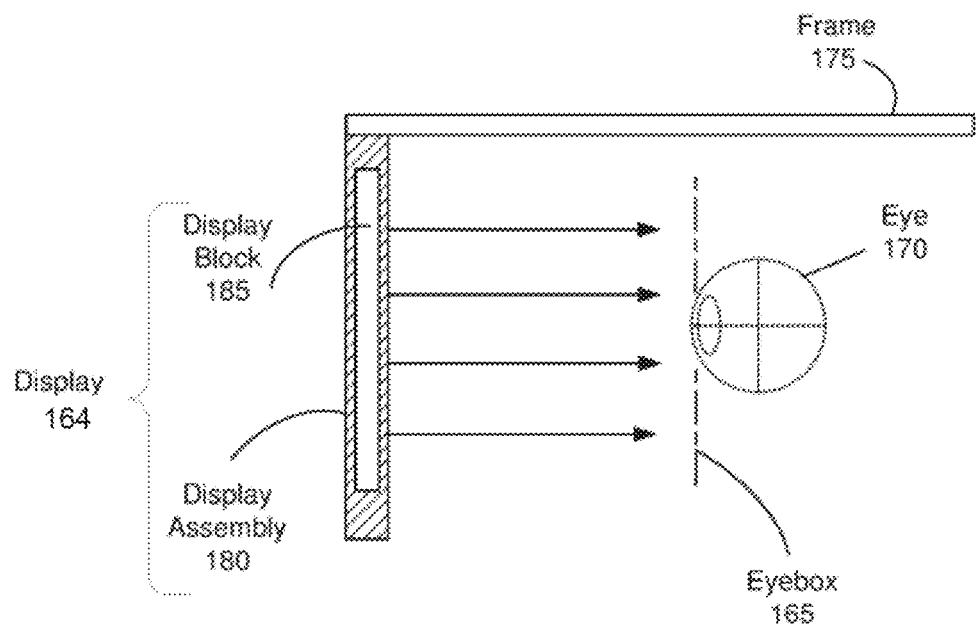
FIG. 2B is a cross-section view of the HMD of FIG. 2A implemented as a near eye display, according to various embodiments.

FIG. 2B is a cross-section view of the HMD 162 of FIG. 2A implemented as a NED, according to various embodiments. This view includes frame 175, display 164 (which comprises a display assembly 180 and a display block 185), and eye 170. The display assembly 180 supplies image light to the eye 170. The display assembly 180 houses display block 185, which, in different embodiments, encloses the different types of imaging optics and redirection structures. For purposes of illustration, FIG. 2B shows the cross section associated with a single display block 185 and a single eye 170, but in alternative embodiments not shown, another display block, which is separate from display block 185 shown in FIG. 2B, provides image light to another eye of the user.

The display block 185, as illustrated, is configured to combine light from a local area with light from computer generated image to form an augmented scene. The display block 185 is also configured to provide the augmented scene to the eyebox 165 corresponding to a location of the user's eye 170. The display block 185 may include, for example, a waveguide display, a focusing assembly, a compensation assembly, or some combination thereof.

HMD 162 may include one or more other optical elements between the display block 185 and the eye 170. The optical elements may act to, for example, correct aberrations in image light emitted from the display block 185, magnify image light emitted from the display block 185, some other optical adjustment of image light emitted from the display block 185, or some combination thereof. The example for optical elements may include an aperture, a Fresnel lens, a convex lens, a concave lens, a filter, or any other suitable optical element that affects image light. In some embodiments, the optical elements may include one or more of the LC patterning control systems discussed in detail below in conjunction with FIGS. 4-12. The display block 185 may also comprise one or more materials (e.g., plastic, glass, etc.) with one or more refractive indices that effectively minimize the weight and widen a field of view of the HMD 162.

Figure 3:
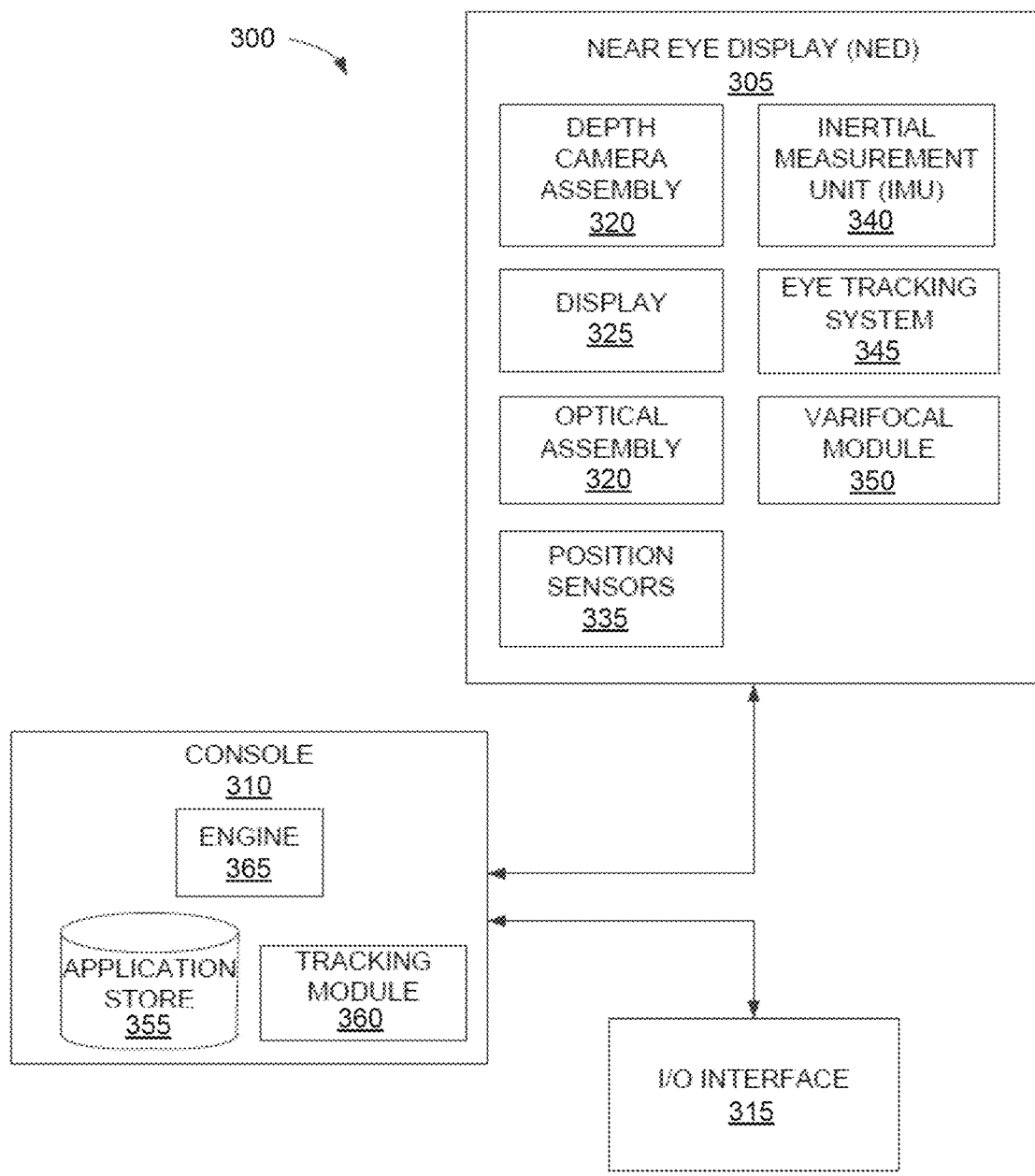
FIG. 3 is a block diagram of a NED system, according to various embodiments.

FIG. 3 is a block diagram of an embodiment of a near eye display system 300 in which a console 310 operates. In some embodiments, the NED system 300 corresponds to the NED 100 or the HMD 162. The NED system 300 may operate in a virtual reality (VR) system environment, an augmented reality (AR) system environment, a mixed reality (MR) system environment, or some combination thereof. The NED system 300 shown in FIG. 3 comprises a NED 305 and an input/output (I/O) interface 315 that is coupled to the console 310.

While FIG. 3 shows an example NED system 300 including one NED 305 and one I/O interface 315, in other embodiments any number of these components may be included in the NED system 300. For example, there may be multiple NEDs 305 that each has an associated I/O interface 315, where each NED 305 and I/O interface 315 communicates with the console 310. In alternative configurations, different and/or additional components may be included in the NED system 300. Additionally, various components included within the NED 305, the console 310, and the I/O interface 315 may be distributed in a different manner than is described in conjunction with FIG. 3 in some embodiments. For example, some or all of the functionality of the console 310 may be provided by the NED 305.

The NED 305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 305 may also present audio content to a user. The NED 305 and/or the console 310 may transmit the audio content to an external device via the I/O interface 315. The external device may include various forms of speaker systems and/or headphones. In various embodiments, the audio content is synchronized with visual content being displayed by the NED 305.

The NED 305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 3, the NED 305 may include a depth camera assembly (DCA) 320, a display 325, an optical assembly 330, one or more position sensors 335, an inertial measurement unit (IMU) 340, an eye tracking system 345, and a varifocal module 350. In some embodiments, the display 325 and the optical assembly 330 can be integrated together into a projection assembly. Various embodiments of the NED 305 may have additional, fewer, or different components than those listed above. Additionally, the functionality of each component may be partially or completely encompassed by the functionality of one or more other components in various embodiments.

The DCA 320 captures sensor data describing depth information of an area surrounding the NED 305. The sensor data may be generated by one or a combination of depth imaging techniques, such as triangulation, structured light imaging, time-of-flight imaging, laser scan, and so forth. The DCA 320 can compute various depth properties of the area surrounding the NED 305 using the sensor data. Additionally or alternatively, the DCA 320 may transmit the sensor data to the console 310 for processing.

The DCA 320 includes an illumination source, an imaging device, and a controller. The illumination source emits light onto an area surrounding the NED 305. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VC-SEL), or some other source. In some embodiments, a single emitter or a plurality of emitters in the illumination source can emit light having a structured light pattern. The imaging device captures ambient light in the environment surrounding NED 305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 325 displays two-dimensional or three-dimensional images to the user in accordance with pixel data received from the console 310. In various embodiments, the display 325 comprises a single display or multiple displays (e.g., separate displays for each eye of a user). In some embodiments, the display 325 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 325 and used separately, in parallel, and/or in combination.

The optical assembly 330 magnifies image light received from the display 325, corrects optical errors associated with the image light, and presents the corrected image light to a user of the NED 305. The optical assembly 330 includes a plurality of optical elements. For example, one or more of the following optical elements may be included in the optical assembly 330: an aperture, a Fresnel lens, a convex lens, a concave lens, a filter, a reflecting surface, or any other suitable optical element that deflects, reflects, refracts, and/or in some way alters image light. Moreover, the optical assembly 330 may include combinations of different optical elements. In some embodiments, one or more of the optical elements in the optical assembly 330 may have one or more coatings, such as partially reflective or antireflective coatings. The optical assembly 330 can be integrated into a projection assembly, e.g., a projection assembly. In one embodiment, the optical assembly 330 includes the optics block 155.

In operation, the optical assembly 330 magnifies and focuses image light generated by the display 325. In so doing, the optical assembly 330 enables the display 325 to be physically smaller, weigh less, and consume less power than displays that do not use the optical assembly 330. Additionally, magnification may increase the field of view of the content presented by the display 325. For example, in some embodiments, the field of view of the displayed content partially or completely uses a user's field of view. For example, the field of view of a displayed image may meet or exceed 310 degrees. In various embodiments, the amount of magnification may be adjusted by adding or removing optical elements.

In some embodiments, the optical assembly 330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 325 is pre-distorted, and the optical assembly 330 corrects the distortion as image light from the display 325 passes through various optical elements of the optical assembly 330. In some embodiments, optical elements of the optical assembly 330 are integrated into the display 325 as a projection assembly that includes at least one waveguide coupled with one or more optical elements.

The IMU 340 is an electronic device that generates data indicating a position of the NED 305 based on measurement signals received from one or more of the position sensors 335 and from depth information received from the DCA 320. In some embodiments of the NED 305, the IMU 340 may be a dedicated hardware component. In other embodiments, the IMU 340 may be a software component implemented in one or more processors.

In operation, a position sensor 335 generates one or more measurement signals in response to a motion of the NED 305. Examples of position sensors 335 include: one or more accelerometers, one or more gyroscopes, one or more magnetometers, one or more altimeters, one or more inclinometers, and/or various types of sensors for motion detection, drift detection, and/or error detection. The position sensors 335 may be located external to the IMU 340, internal to the IMU 340, or some combination thereof.

Based on the one or more measurement signals from one or more position sensors 335, the IMU 340 generates data indicating an estimated current position of the NED 305 relative to an initial position of the NED 305. For example, the position sensors 335 may include multiple accelerometers to measure translational motion (forward/back, up/down, left/right) and multiple gyroscopes to measure rotational motion (e.g., pitch, yaw, and roll). In some embodiments, the IMU 340 rapidly samples the measurement signals and calculates the estimated current position of the NED 305 from the sampled data. For example, the IMU 340 may integrate the measurement signals received from the accelerometers over time to estimate a velocity vector and integrates the velocity vector over time to determine an estimated current position of a reference point on the NED 305. Alternatively, the IMU 340 provides the sampled measurement signals to the console 310, which analyzes the sample data to determine one or more measurement errors. The console 310 may further transmit one or more of control signals and/or measurement errors to the IMU 340 to configure the IMU 340 to correct and/or reduce one or more measurement errors (e.g., drift errors). The reference point is a point that may be used to describe the position of the NED 305. The reference point may generally be defined as a point in space or a position related to a position and/or orientation of the NED 305.

In various embodiments, the IMU 340 receives one or more parameters from the console 310. The one or more parameters are used to maintain tracking of the NED 305.

Based on a received parameter, the IMU 340 may adjust one or more IMU parameters (e.g., a sample rate). In some embodiments, certain parameters cause the IMU 340 to update an initial position of the reference point so that it corresponds to a next position of the reference point. Updating the initial position of the reference point as the next calibrated position of the reference point helps reduce drift errors in detecting a current position estimate of the IMU 340.

In some embodiments, the eye tracking system 345 is integrated into the NED 305. The eye-tracking system 345 may comprise one or more illumination sources and an imaging device (camera). In operation, the eye tracking system 345 generates and analyzes tracking data related to a user's eyes as the user wears the NED 305. The eye tracking system 345 may further generate eye tracking information that may comprise information about a position of the user's eye, i.e., information about an angle of an eye-gaze.

In some embodiments, the varifocal module 350 is further integrated into the NED 305. The varifocal module 350 may be communicatively coupled to the eye tracking system 345 in order to enable the varifocal module 350 to receive eye tracking information from the eye tracking system 345. The varifocal module 350 may further modify the focus of image light emitted from the display 325 based on the eye tracking information received from the eye tracking system 345. Accordingly, the varifocal module 350 can reduce vergence-accommodation conflict that may be produced as the user's eyes resolve the image light. In various embodiments, the varifocal module 350 can be interfaced (e.g., either mechanically or electrically) with at least one optical element of the optical assembly 330.

In operation, the varifocal module 350 may adjust the position and/or orientation of one or more optical elements in the optical assembly 330 in order to adjust the focus of image light propagating through the optical assembly 330. In various embodiments, the varifocal module 350 may use eye tracking information obtained from the eye tracking system 345 to determine how to adjust one or more optical elements in the optical assembly 330. In some embodiments, the varifocal module 350 may perform foveated rendering of the image light based on the eye tracking information obtained from the eye tracking system 345 in order to adjust the resolution of the image light emitted by the display 325. In this case, the varifocal module 350 configures the display 325 to display a high pixel density in a foveal region of the user's eye-gaze and a low pixel density in other regions of the user's eye-gaze.

The I/O interface 315 facilitates the transfer of action requests from a user to the console 310. In addition, the I/O interface 315 facilitates the transfer of device feedback from the console 310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 315 may include one or more input devices. Example input devices include: a keyboard, a mouse, a game controller, a joystick, and/or any other suitable device for receiving action requests and communicating the action requests to the console 310. In some embodiments, the I/O interface 315 includes an IMU 340 that captures calibration data indicating an estimated current position of the I/O interface 315 relative to an initial position of the I/O interface 315.

In operation, the I/O interface 315 receives action requests from the user and transmits those action requests to the console 310. Responsive to receiving the action request, the console 310 performs a corresponding action. For example, responsive to receiving an action request, the console 310 may configure the I/O interface 315 to emit haptic feedback onto an arm of the user. For example, the console 315 may configure the I/O interface 315 to deliver haptic feedback to a user when an action request is received. Additionally or alternatively, the console 310 may configure the I/O interface 315 to generate haptic feedback when the console 310 performs an action, responsive to receiving an action request.

The console 310 provides content to the NED 305 for processing in accordance with information received from one or more of: the DCA 320, the NED 305, and the I/O interface 315. As shown in FIG. 3, the console 310 includes an application store 355, a tracking module 360, and an engine 365. In some embodiments, the console 310 may have additional, fewer, or different modules and/or components than those described in conjunction with FIG. 3. Similarly, the functions further described below may be distributed among components of the console 310 in a different manner than described in conjunction with FIG. 3.

The application store 355 stores one or more applications for execution by the console 310. An application is a group of instructions that, when executed by a processor, performs a particular set of functions, such as generating content for presentation to the user. For example, an application may generate content in response to receiving inputs from a user (e.g., via movement of the NED 305 as the user moves his/her head, via the I/O interface 315, etc.). Examples of applications include: gaming applications, conferencing applications, video playback applications, or other suitable applications.

The tracking module 360 calibrates the NED system 300 using one or more calibration parameters. The tracking module 360 may further adjust one or more calibration parameters to reduce error in determining a position and/or orientation of the NED 305 or the I/O interface 315. For example, the tracking module 360 may transmit a calibration parameter to the DCA 320 in order to adjust the focus of the DCA 320. Accordingly, the DCA 320 may more accurately determine positions of structured light elements reflecting off of objects in the environment. The tracking module 360 may also analyze sensor data generated by the IMU 340 in determining various calibration parameters to modify. Further, in some embodiments, if the NED 305 loses tracking of the user's eye, then the tracking module 360 may re-calibrate some or all of the components in the NED system 300. For example, if the DCA 320 loses line of sight of at least a threshold number of structured light elements projected onto the user's eye, the tracking module 360 may transmit calibration parameters to the varifocal module 350 in order to re-establish eye tracking.

The tracking module 360 tracks the movements of the NED 305 and/or of the I/O interface 315 using information from the DCA 320, the one or more position sensors 335, the IMU 340 or some combination thereof. For example, the tracking module 360 may determine a reference position of the NED 305 from a mapping of an area local to the NED 305. The tracking module 360 may generate this mapping based on information received from the NED 305 itself. The tracking module 360 may also utilize sensor data from the IMU 340 and/or depth data from the DCA 320 to determine references positions for the NED 305 and/or I/O interface 315. In various embodiments, the tracking module 360 generates an estimation and/or prediction for a subsequent position of the NED 305 and/or the I/O interface 315. The tracking module 360 may transmit the predicted subsequent position to the engine 365.

The engine 365 generates a three-dimensional mapping of the area surrounding the NED 305 (i.e., the "local area") based on information received from the NED 305. In some embodiments, the engine 365 determines depth information for the three-dimensional mapping of the local area based on depth data received from the DCA 320 (e.g., depth information of objects in the local area). In some embodiments, the engine 365 calculates a depth and/or position of the NED 305 by using depth data generated by the DCA 320. In particular, the engine 365 may implement various techniques for calculating the depth and/or position of the NED 305, such as stereo based techniques, structured light illumination techniques, time-of-flight techniques, and so forth. In various embodiments, the engine 365 uses depth data received from the DCA 320 to update a model of the local area and to generate and/or modify media content based in part on the updated model.

The engine 365 also executes applications within the NED system 300 and receives position information, acceleration information, velocity information, predicted future positions, or some combination thereof, of the NED 305 from the tracking module 360. Based on the received information, the engine 365 determines various forms of media content to transmit to the NED 305 for presentation to the user. For example, if the received information indicates that the user has looked to the left, the engine 365 generates media content for the NED 305 that mirrors the user's movement in a virtual environment or in an environment augmenting the local area with additional media content. Accordingly, the engine 365 may generate and/or modify media content (e.g., visual and/or audio content) for presentation to the user. The engine 365 may further transmit the media content to the NED 305. Additionally, in response to receiving an action request from the I/O interface 315, the engine 365 may perform an action within an application executing on the console 310. The engine 305 may further provide feedback when the action is performed. For example, the engine 365 may configure the NED 305 to generate visual and/or audio feedback and/or the I/O interface 315 to generate haptic feedback to the user.

In some embodiments, based on the eye tracking information (e.g., orientation of the user's eye) received from the eye tracking system 345, the engine 365 determines a resolution of the media content provided to the NED 305 for presentation to the user on the display 325. The engine 365 may adjust a resolution of the visual content provided to the NED 305 by configuring the display 325 to perform foveated rendering of the visual content, based at least in part on a direction of the user's gaze received from the eye tracking system 345. The engine 365 provides the content to the NED 305 having a high resolution on the display 325 in a foveal region of the user's gaze and a low resolution in other regions, thereby reducing the power consumption of the NED 305. In addition, using foveated rendering reduces a number of computing cycles used in rendering visual content without compromising the quality of the user's visual experience. In some embodiments, the engine 365 can further use the eye tracking information to adjust a focus of the image light emitted from the display 325 in order to reduce vergence-accommodation conflicts.

Figure 4:
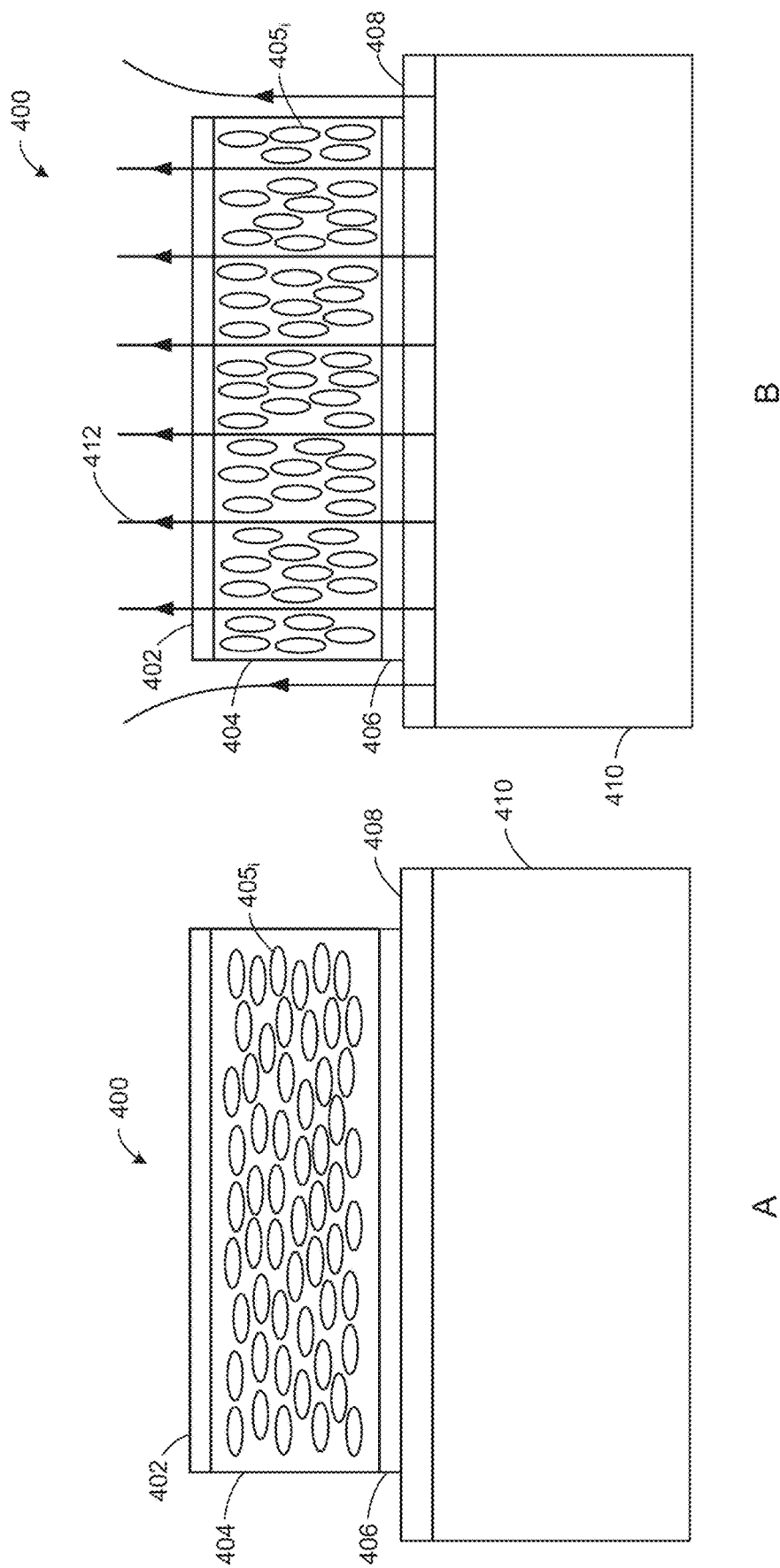
FIG. 4 is a schematic diagram illustrating an approach for reorienting liquid crystals (LCs) using magnetic fields, according to various embodiments.

Magnetic Field Driven Reorientation of Liquid Crystals in a Liquid Crystal Patterning Control System FIG. 4 is a schematic diagram illustrating an approach for reorienting liquid crystals (LCs) using magnetic fields, according to various embodiments. Panel A shows the geometry associated with a pixel 400 of a LC patterning control system that uses magnetic fields to drive the reorientation of LCs. As used herein, a pixel refers to a LC cell, which may include a LC and alignment layer(s), along with a drive method, such as a magnet. In some embodiments, dividers are not required between pixels or cells, although dividers may be used in other embodiments. For example, in an embodiment without dividers, a magnet that reorients a portion of a LC layer may be considered one cell, another magnet that reorients a different portion of the LC layer may be considered a next cell, etc.

As shown, the pixel 400 includes a LC layer 404 between two alignment layers 402 and 406, a reflective layer 408, and a magnet 410. Although one pixel 400 is shown for illustrative purposes, a LC patterning control system may generally include any number of pixels, such as an array of pixels. The pixels in some embodiments may also include additional, or different, layers than those shown, such as glass substrate layers surrounding the alignment layers 402 and 406, polarization layers on one or both sides of the glass substrate layers, etc. Although FIG. 4 shows a reflective LC patterning control system, LCs may also be reoriented using magnetic fields in transmissive LC patterning control systems in some embodiments, as discussed below.

Liquid crystals are birefringent, meaning the refractive index of a LC depends on orientation. In some embodiments, the LC layer 404 may include a uniaxial nematic LC having an ordinary refractive index along an optical axis, sometimes referred to as the "director," with which anisotropic molecules $405_i$ (collectively referred to as molecules 405 and individually referred to as molecule 405) of the LC layer 404 are aligned, as well as an extraordinary refractive index along a direction perpendicular to the optical axis. In such cases, a magnetic field may be applied to reorient the optical axis, thereby changing the refractive index with respect to light incident on the LC layer 404. As a result, a phase of light passing through the LC layer 404 will be modulated differently when the magnetic field is applied than when no (or a different) magnetic field is applied, which may represent different states of the pixel 400 (e.g., ON and OFF states). Other embodiments may use any technically feasible type of LC, including chiral nematic LCs (also sometimes referred to as LCs in the "cholesteric" phase), biaxial nematic LCs, etc. It should be understood that the response to a magnetic field may vary depending on the type of LC used.

Although discussed herein primarily with respect to phase modulation, in some embodiments, a LC patterning control system may be used to modulate the amplitude of light in addition to, or in lieu, to modulating the phase of light. For example, a set of crossed polarizers including a linear polarizer for polarizing light that is input into a LC at 45° and an analyzer that transmits a component of light output by the LC could be used in some embodiments to control the transmission of light. Other amplitude modulation schemes may be used in alternative embodiments. Although discussed herein primarily with respect to LCs, birefringent materials other than LCs may be used in some embodiments.

As shown, the alignment layers 402 and 406 induce the molecules 405 of the LC layer 404 into a substantially uniform planar alignment. In some embodiments, the alignment layers 402 and 406 may be formed by rubbing polymer surfaces. More generally, any technically feasible process may be used to align the molecules 405 of the LC layer 404. Although a planar alignment is shown for illustrative purposes, embodiments may include LCs with any suitable alignment, such as a homeotropic alignment in which LC molecules are aligned perpendicular to the alignment layers 402 and 406.

As shown in panel B, application of a magnetic field 412 reorients the LC molecules 405 by aligning them with the magnetic field 412, which is substantially uniform except for fringe fields at the sides of the magnet 410. It should be understood that the magnetic field 412 may also extend elsewhere, such as inside the magnet 410, but such portions of magnetic fields are not shown herein for simplicity. Further, it should be understood that some LC molecules 405 may not be completely aligned with the magnetic field 412, and the degree of alignment achieved may generally depend on, e.g., the LC material used to construct the LC layer 404 and the strength of the magnetic field 412. Illustratively, an area of the LC layer 404 is smaller than an area of the magnet 410. As a result, the LC molecules 405 are substantially unaffected by the fringe field. Upon application of the magnetic field 412, the LC molecules 405 are reoriented from a planar alignment to a direction perpendicular to the plane by a substantially uniform part of the magnetic field 412 that is generated by the magnet 410.

In operation, light from one or more light emission devices may be incident on a LC patterning control system comprising an array of pixels, including the pixel 400. Polarized light may be used in some embodiments. In other embodiments, the LC patterning control system may work equally well on both polarizations. In general, the LC patterning control system may be, e.g., a spatial light modulator, a Pancharatnam-Berry phase (PBP) lens, a liquid crystal display (LCD) screen, a varifocal lens, or used in holography (e.g., polarization volume holograms, point source holograms, Fourier transform holograms, or other computer-generated holograms), among other things. By controlling the states of pixels in the LC patterning control system, a spatially varying modulation may be imposed on the light, with the modulated light being reflected back by the reflective layer 408. For example, pixels of a spatial light modulator could be switched ON and OFF, thereby forming image(s) reflected toward a viewer. As another example, to generate a hologram, holography equations could be solved in order to determine pixel states needed to generate the hologram from light emitted by a coherent light source, such as a laser. Additional and further examples are discussed in greater detail below.

Figure 5A:
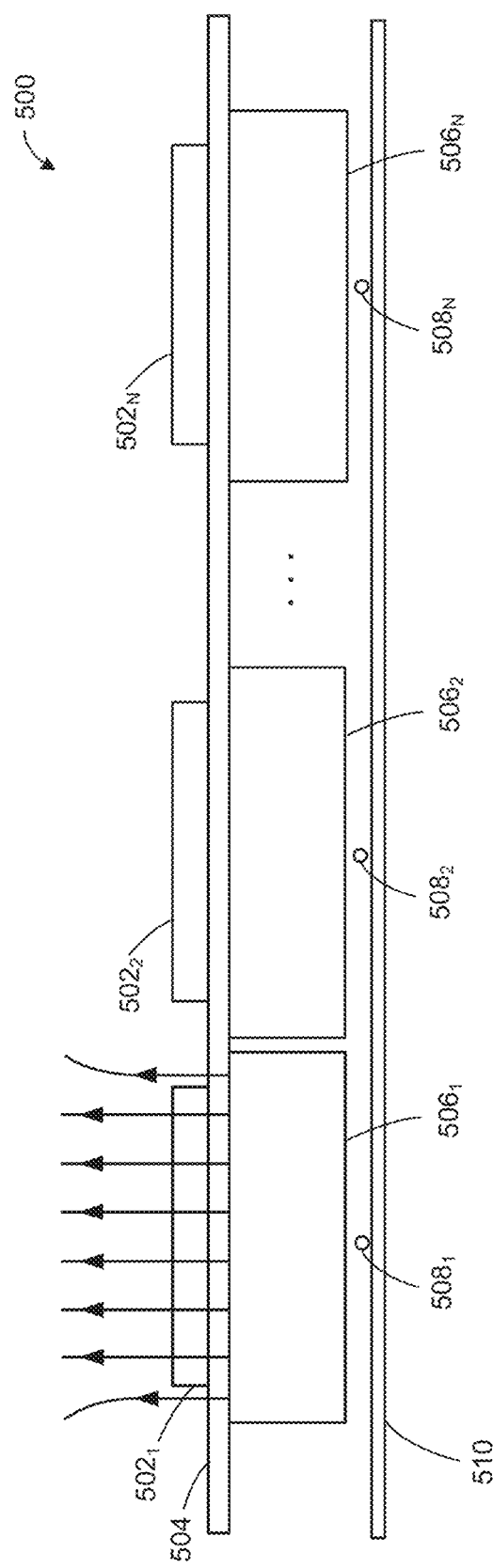
FIG. 5A is a schematic diagram illustrating a cross-section view of a LC patterning control system, according to various embodiments.

FIG. 5A is a schematic diagram illustrating a cross-section view of a LC patterning control system 500, according to various embodiments. As shown, the LC patterning control system 500 includes an array of pixels comprising respective LCs 5021 to 502N (collectively referred to as LCs 502 and individually referred to as LC 502) and corresponding magnets 5061 to 506N (collectively referred to as magnets 506 and individually referred to as magnet 506). All or some of the components of the LC patterning control system 500 may be in physical contact with one another, share a substrate with one another, laminated with one another, optically in contact with one another, have index matching fluid or optical glue between one another, and/or may have space therebetween.

The LCs 502 and magnets 506 may be constructed from any technically feasible materials. As described, the LCs 502 may include any suitable type of LCs, such as uniaxial nematic LCs, chiral nematic LCs, biaxial nematic LCs, etc. In some embodiments, the magnets 506 may include magnetic micro or nanoparticles. Patterned magnetic multilayer films, or perpendicularly magnetized films, may be used in some embodiments. Small (<1 µm) magnetic particles are capable of generating external magnetic fields over the critical field $H_c$ required to reorient some LCs. For example, some nanomagnets can generate magnetic fields on the order of ~1-2 T, which is sufficient to completely align some LCs. The fields generated by a small magnetic particle extends a distance ~d, where d is a characteristic dimension of the particle. The magnetic particles 506 may be of any suitable shape and/or size, including particles of size 50 nm and smaller. The LCs 502 may also be of any suitable shape and/or size. For example, in some embodiments, each of the LCs 502 may be a few hundred nanometers thick. In some embodiments, the sizes of pixels in the LC patterning control system 500 may be reduced to below the limit of traditional LC devices that rely on electric fields, including pixel sizes of less than ~1 µm.

Figure 5B:
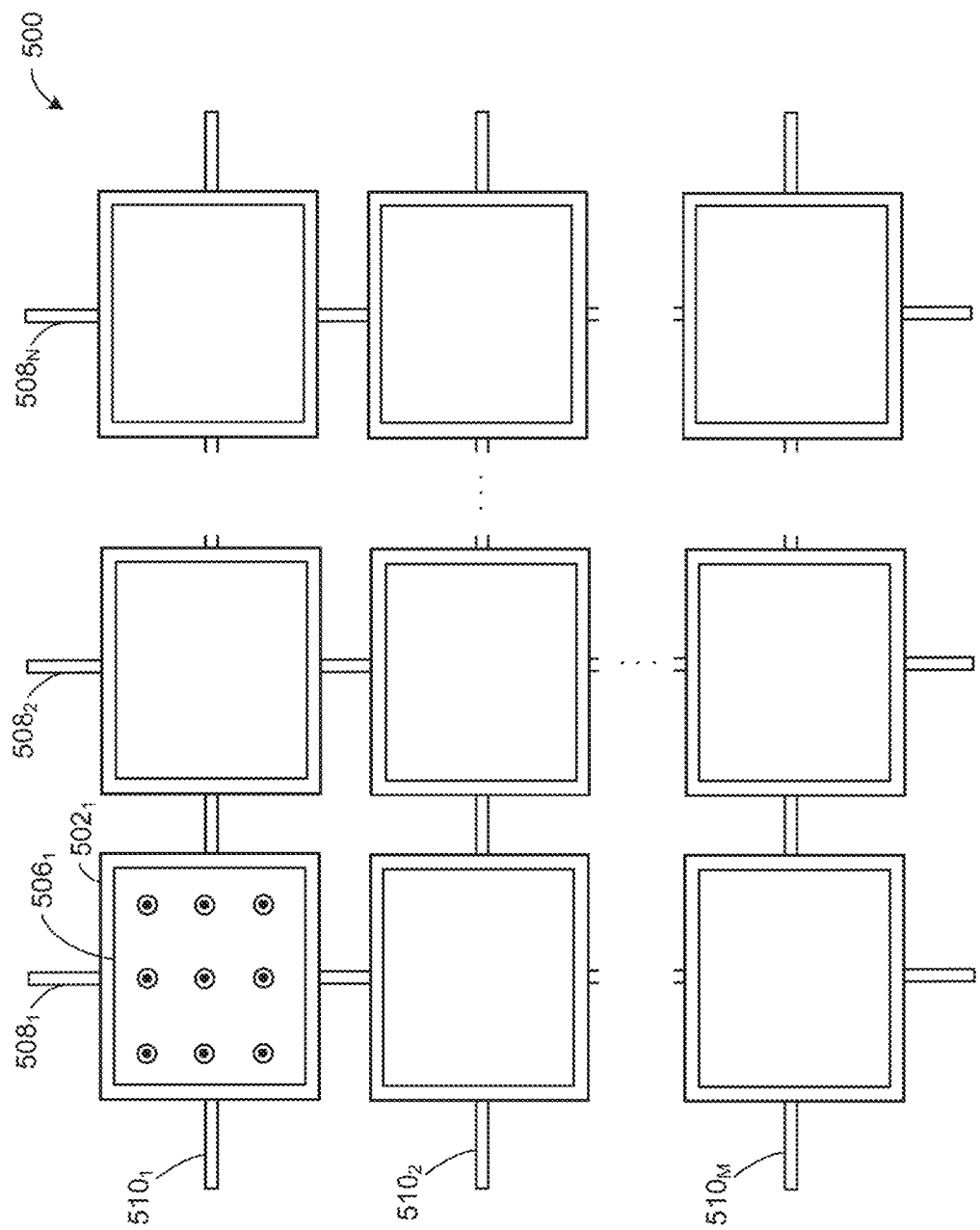
FIG. 5B is a schematic diagram illustrating a top-down view of the LC patterning control system shown in FIG. 5A, according to various embodiments.

In some embodiments, the magnets 506 may be anisotropic. That is, the magnets 506 may have multiple preferred magnetization directions, which are also sometimes referred to as "easy axes." For example, in some embodiments, each of the magnets 506 may have two easy axes, such as one in the plane and another perpendicular to the plane (as shown in FIGS. 5A-5B) or two in the plane at orthogonal angles. Further, the magnetization direction of a magnet 506 may remain stable after aligning with one of the easy axes. Such an existence of two stable equilibrium states is referred to as bistability.

The LC patterning control system 500 further includes a reflective layer 504 and a grid of wires 5081 to 508N (collectively referred to as wires 508 and individually referred to as wire 508) and 510, which are discussed in greater detail below with respect to FIG. 5B. Although particular layers are shown for illustrative purposes, some embodiments may include additional layers, such as alignment layers and glass substrate layers surrounding each of the LCs 502, polarization layers on one or both sides of the glass substrate layers, etc., similar to the discussion above with respect to FIG. 4.

Light incident on the LC patterning control system 500 may pass through the LCs 502 and be reflected by the reflective layer 504 toward, e.g., a viewer or optical element(s) such as a lens. That is, the LC patterning control system 500 acts as a mirror, with LCs 502 that modulate light incident thereon to generate a spatially varying modulation of light. As described, the light that is projected onto the LC patterning control system 500 may also be polarized in some embodiments.

In some embodiments, gaps between the magnets 506, such as the gap 5071, may be covered by a reflective material, and the reflective layer 504 may be formed by sputtering the reflective material, such as chrome, on top of the magnets 506 and the gaps. Doing so may eliminate diffraction that would otherwise be produced by the gaps.

FIG. 5B is a schematic diagram illustrating a top-down view of the LC patterning control system 500, according to various embodiments. As shown, the wires 508 and 510 are disposed in a crossed-wire scheme below the magnets 506 and the LCs 502. The reflective layer 504 above the magnets 506 has been omitted for illustrative purposes.

As shown, respective pairs of the wires 508 and 510 cross at each of the LCs 502. Magnetic fields are generated by the flowing of current through the wires 508 and 510. For example, thin-film transistors could be used to drive currents through the wires 508 and 510. The magnetic field generated by the flowing of current through a wire is H~l/r, where l is the current in the wire and r is the distance from the wire. By using magnets 506 for which the coercive field required to switch the magnets 506 is ~2l/r, two of the wires 508 and 510 can be driven at the same time to generate the coercive field needed to switch one of the magnets 506 between, e.g., different easy axes where the magnets 506 are anisotropic. Returning to the example above in which each of the magnets 506 has two easy axes, current may be driven through pairs of the wires 508 and 510 intersecting at a magnet 506 to nudge its magnetization toward one of the easy axes, after which the magnetization may snap to the easy axis direction. Further, the magnetization may remain fixed (in the absence of additional currents being driven through the wires 508 and 510) without power dissipation, in contrast to traditional LC devices that require continuous power dissipation to maintain the election fields for aligning LCs. Current may thereafter be driven through the same wires, but in the opposite directions, to switch the magnet back to its other easy axis, thereby reversing the direction of the magnetic field.

For example, a magnet $506_1$ could be switched by driving current through both of the wires $508_1$ and $510_1$ that intersect at the magnet $506_1$. In such a case, twice the magnetic field of a wire is generated at the intersection, while magnets 506 above only one of the wires $508_1$ and $510_1$ would only see the magnetic field associated with that wire. For example, magnetization of the magnets 506 may initially be in the plane, and the magnetization of the magnet $506_1$ may be switched to produce a magnetic field that is perpendicular to the plane, as shown in FIG. 5B. Anisotropic molecules of the LC $502_1$ may reorient to align with the perpendicular magnetic field, as described above with respect to FIG. 4. Such an alignment with the magnetic field may represent, e.g., an ON state of the pixel, while other LCs 502 (in, e.g., a planar alignment) may represent an OFF state, or vice versa. Further, the magnets 506 and associated LCs 502 may be rapidly switched (e.g., at 10-100 ns) in some embodiments.

Although the wires 508 and 510 are shown as being disposed below and being thinner than the magnets 506, any technically feasible configuration of wires may be used to create the coercive fields needed to switch the magnets 506. For example, in some embodiments, the wires 508 and 510 may be the same thickness as the magnets 506. As another example, wires may be disposed on the sides of magnets, rather than below the magnets, in some embodiments. Further, although exemplary drive schemes, such as those described with respect to FIGS. 5A-5B, 6A-6B, 7A-7B, and 8A-8B, are disclosed herein for illustrative purposes, any technically feasible scheme for driving LCs using magnetic fields may be employed in alternative embodiments.

FIG. 6A is a schematic diagram illustrating a cross-section view of another LC patterning control system 600, according to various embodiments. As shown, the LC patterning control system 600 includes an array of pixels comprising respective LCs $602_1$ to 602N (collectively referred to as LCs 602 and individually referred to as LC 602), a reflective layer 604, a layer 606 including magnetic domains $607_1$ to $607_{NN}$ (collectively referred to as magnetic domains 607 and individually referred to as magnetic domain 607), and wires $608_1$ to $608_N$ (collectively referred to as wires 608 and individually referred to as wire 608) and 610. The LCs 602, the reflective layer 604, and the wires 608 and 610 are similar to the LCs 502, the reflective layer 504, and the wires 508 and 510, respectively, of the LC patterning control system 500 and will not be described in detail for conciseness. All or some of the components of the LC patterning control system 600 may be in physical contact with one another, share a substrate with one another, laminated with one another, optically in contact with one another, have index matching fluid or optical glue between one another, and/or may have space therebetween.

A magnetic domain is a region within a magnetic material in which magnetization is in a uniform direction due to the magnetic moments of atoms being aligned to point in the same direction. A continuous film of magnetic material in which the magnetic moments of atoms are aligned in the same direction will not produce a magnetic field above the film. However, the magnetic fields at transitions between magnetic domains of a magnetic film can extend above the film. In some embodiments, LCs may be placed above such transition regions where magnetic fields extend above a film of magnetic material.

Illustratively, the magnetic layer 606 includes magnetic domains 607 with transitions below the LCs 602. For example, magnetic moments of atoms in the magnetic domains $607_1$ and $607_3$ could be aligned in a different direction than magnetic moments of atoms in the magnetic domain $607_2$. Although a particular configuration is shown for illustrative purposes, other configurations may be used in alternative embodiments. Magnetic domains are generally separated by transition regions called domain walls, and the magnetic domains 607 may be separated by domain walls having any suitable properties (narrow or broad, how easily they move, etc.) in some embodiments.

In some embodiments, the magnetic domains 607 may be anisotropic, with two (or more) easy axes along which magnetization of the magnetic domains 607 may be switched, similar to the discussion above with respect to the magnets 506 of the LC patterning control system 500. Further, in some embodiments, the magnetic domains 607 may be sufficiently small that a pixel size of the LC patterning control system 600 can be reduced below the limit of traditional LC devices, including pixel sizes of less than ~1 µm.

Figure 6B:
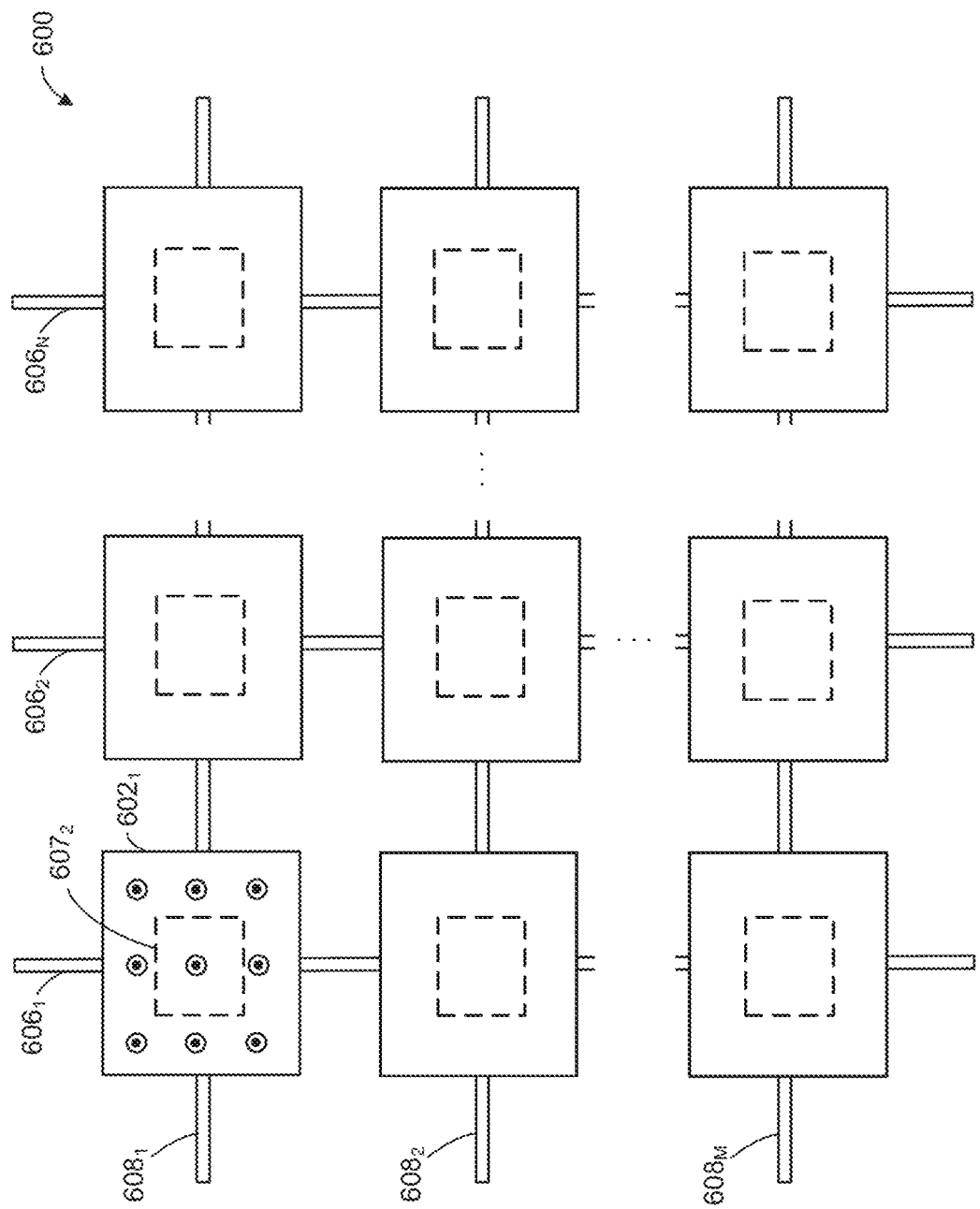
FIG. 6B is a schematic diagram illustrating a top-down view of the LC patterning control system shown in FIG. 6A, according to various embodiments.

FIG. 6B is a schematic diagram illustrating a top-down view of the LC patterning control system 600, according to various embodiments. As shown, the wires 608 and 610 are disposed in a crossed-wire scheme below the LCs 602 and corresponding magnetic domains, similar to the wires 508 and 510 described above with respect to FIG. 5B. Magnetic fields can be generated by the flowing of current through the wires 608 and 610. For example, thin-film transistors could be used to drive currents through the wires 608 and 610. The magnetic field generated by the flowing of current through one of the wires 608 and 610 is H~l/r, and two of the wires 608 and 610 may be driven at the same time to generate a coercive field ~2l/r needed to switch one of the magnetic domains 607 between, e.g., different easy axes where the magnetic domains 607 are anisotropic, similar to the discussion above with respect to FIG. 5B.

For example, the magnet domain $607_2$ could be switched by driving current through both of the wires $608_1$ and $610_1$ that intersect at the magnetic domain $607_2$. As shown in FIGS. 6A-6B, doing so produces a magnetic field that is perpendicular to the plane. Anisotropic molecules of the LC $602_1$ may reorient to align with such a magnetic field, representing, e.g., an ON state of the pixel, while LCs 602 whose molecules are not so aligned (and in, e.g., a planar alignment) may represent an OFF state, or vice versa. Similar to the magnets 506 and LCs 502 described above with respect to FIG. 5B, the magnetic domains 607 and associated LCs 602 may be rapidly switched (at, e.g., 10-100 ns) in some embodiments. Further, when not being switched, magnetizations of the magnetic domains 607 may remain fixed without power dissipation.

Although the wires 608 and 610 are shown as being disposed below and being thinner than the magnetic domains 607, any technically feasible configuration of wires capable of creating the coercive fields needed to switch magnetic domains may be used, including thicker wires and wires disposed on the sides of magnetic domains.

Figure 7A:
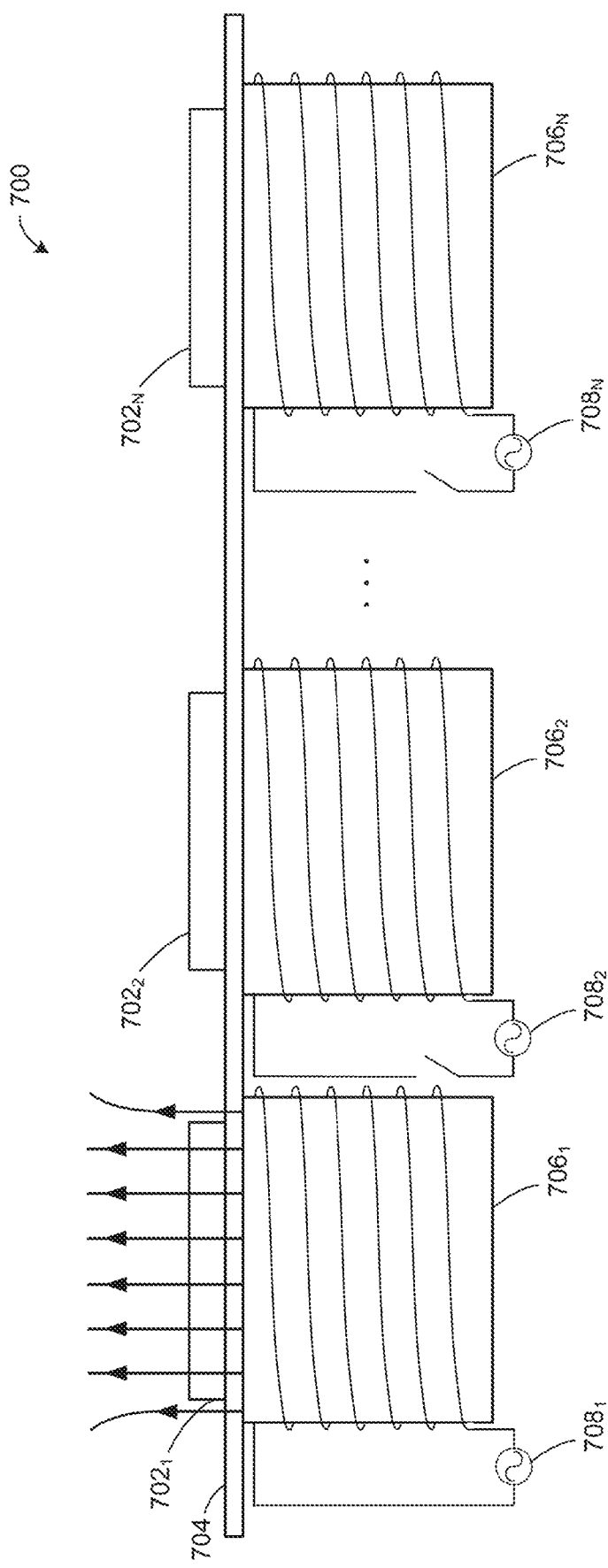
FIG. 7A is a schematic diagram illustrating a cross-section view of another LC patterning control system, according to various embodiments.

FIG. 7A is a schematic diagram illustrating a cross-section view of another LC patterning control system 700, according to various embodiments. As shown, the LC patterning control system 700 includes an array of pixels comprising respective LCs $702_1$ to $702_N$ (collectively referred to as LCs 702 and individually referred to as LC 702) and corresponding magnets $706_1$ to $706_N$ (collectively referred to as magnets 706 and individually referred to as magnet 706), as well as a reflective layer 704. The LCs 702 and the reflective layer 704 are similar to the LCs 502 and the reflective layer 504, respectively, of the LC patterning control system 500 and will not be described in detail for conciseness. All or some of the components of the LC patterning control system 700 may be in physical contact with one another, share a substrate with one another, laminated with one another, optically in contact with one another, have index matching fluid or optical glue between one another, and/or may have space therebetween.

As shown, each of the magnets 706 is an electromagnet comprising a high permeability core around which a coil of wire is wrapped. In some embodiments, the coil of wire may be a micro or nanocoil. The coil of wire and the high permeability core may be constructed from any technically feasible materials. For example, the high permeability core could be an iron core. In some embodiments, the magnets 706 may be sufficiently small that a pixel size of the LC patterning control system 700 can be reduced below the limit of traditional LC devices, including pixel sizes of less than ~1 μm.

In operation, the flowing of current through the coil of wire of a magnet 706 creates a magnetic field therein. In addition, the strength of such a magnetic field is multiplied by a permeability of the core, i.e., the field that is generated equals B=μH, where μ is the permeability of the core and H is the field due to the current in the wire. As a result, a relatively large magnetic field can be generated with a relatively low current. For example, an iron core could enhance the strength of a magnetic field by a factor of 10,000. Although the magnetic field inside the core itself is not useful, the field just outside an end of the core is substantially equal to the field inside. As shown, each of the LCs 702 is disposed above the core of a respective magnet 706 so as to experience such a magnetic field just outside the core of the magnet 706.

Respective voltages $708_1$ to $708_N$ (collectively referred to as voltages 708 and individually referred to as voltage 708) may be applied to drive currents through the coils around the magnets 706. Illustratively, application of the voltage $708_1$ drives current through the coil around the magnet $706_1$, thereby generating a magnetic field. In some embodiments, the coils around the magnets 706 may also be connected to a common ground. For example, one end of the coil could be connected to a voltage (+/−V) and the other to ground. Doing so drives current through the coil, and switching the positive and negative voltages (+V to −V or −V to +V) switches the direction of the magnetic field.

Figure 7B:
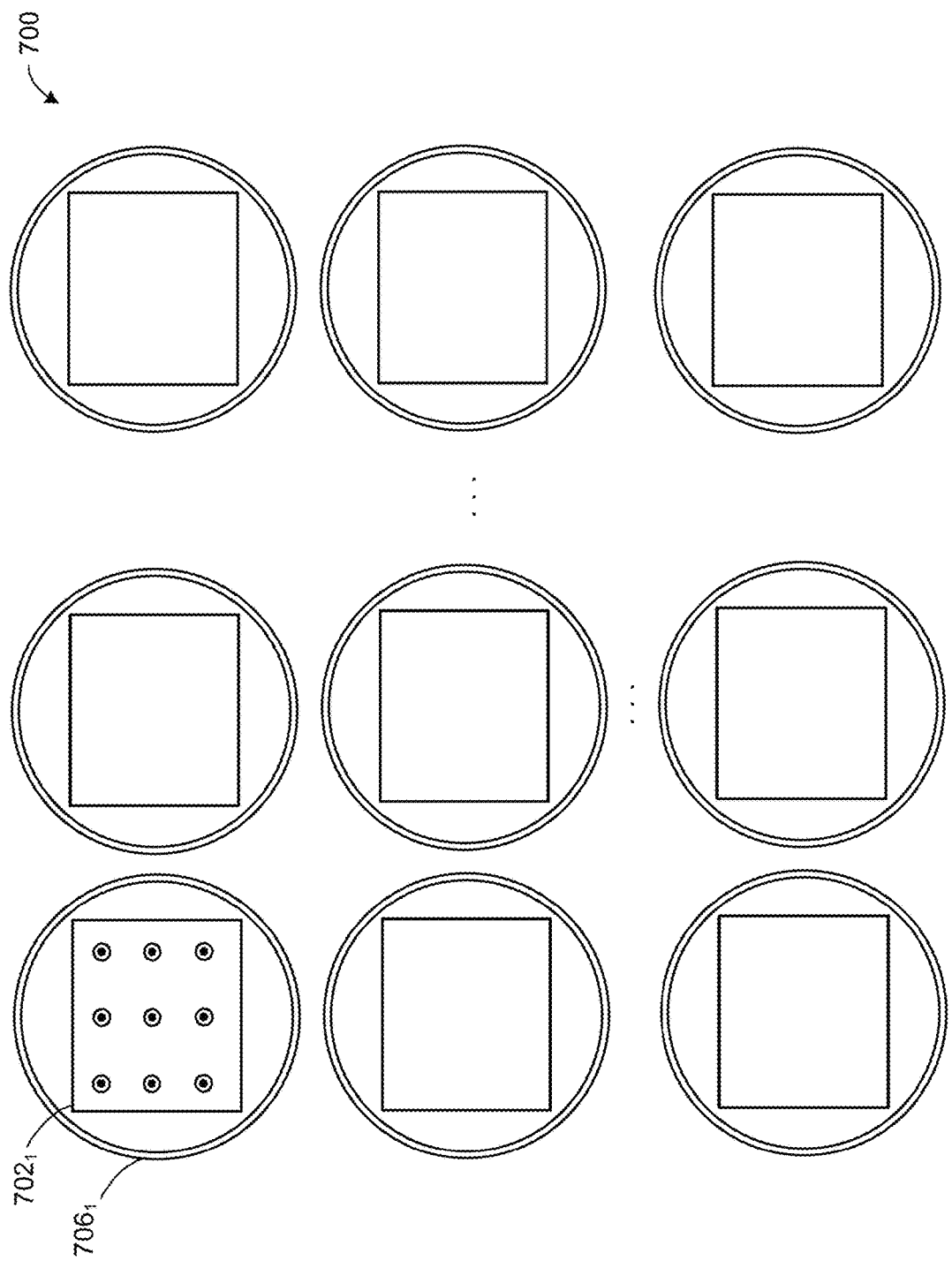
FIG. 7B is a schematic diagram illustrating a top-down view of the LC patterning control system shown in FIG. 7A, according to various embodiments.

FIG. 7B is a schematic diagram illustrating a top-down view of the LC patterning control system 700, according to various embodiments. As shown, application of a voltage causes current to be driven in a coil of the magnet $706_1$, thereby generating a magnetic field perpendicular to the plane. Anisotropic molecules of the LC $702_1$ may reorient to align with such a magnetic field, which may represent, e.g., an ON state of the pixel, while LCs 702 whose molecules are not aligned with a magnetic field (and in, e.g., a planar alignment) may represent an OFF state, or vice versa.

Figure 8A:
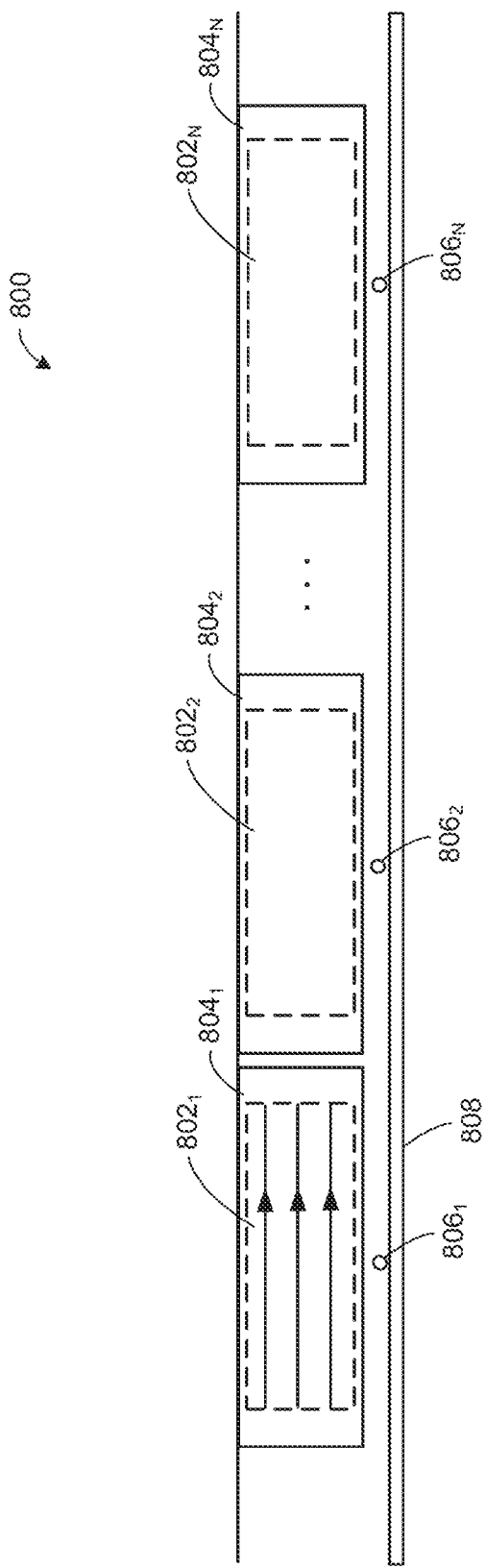
FIG. 8A is a schematic diagram illustrating a cross-section view of another LC patterning control system, according to various embodiments.

FIG. 8A is a schematic diagram illustrating a cross-section view of another LC patterning control system 800, according to various embodiments. As shown, the LC patterning control system 800 includes an array of pixels comprising respective LCs $802_1$ to $802_N$ (collectively referred to as LCs 802 and individually referred to as LC 802), and corresponding magnets $804_1$ to $804_N$ (collectively referred to as magnets 804 and individually referred to as magnet 804). The LCs 802 are similar to the LCs 502 of the LC patterning control system 500 and will not be described in detail for conciseness. All or some of the components of the LC patterning control system 800 may be in physical contact with one another, share a substrate with one another, laminated with one another, optically in contact with one another, have index matching fluid or optical glue between one another, and/or may have space therebetween.

As shown, each of the magnets 804 is wrapped around one of the LCs 802. In some embodiments, the magnets 804 may be anisotropic, with two (or more) easy axes along which magnetization of the magnets 804 may be switched, similar to the discussion above with respect to the magnets 506 of the LC patterning control system 500. Further, the magnets 804 in some embodiments may be sufficiently small that a pixel size of the LC patterning control system 800 can be reduced below the limit of traditional LC devices, including pixel sizes of less than ~1 μm. In some other embodiments, two or more magnets may be placed at the edge of each cell.

Figure 8B:
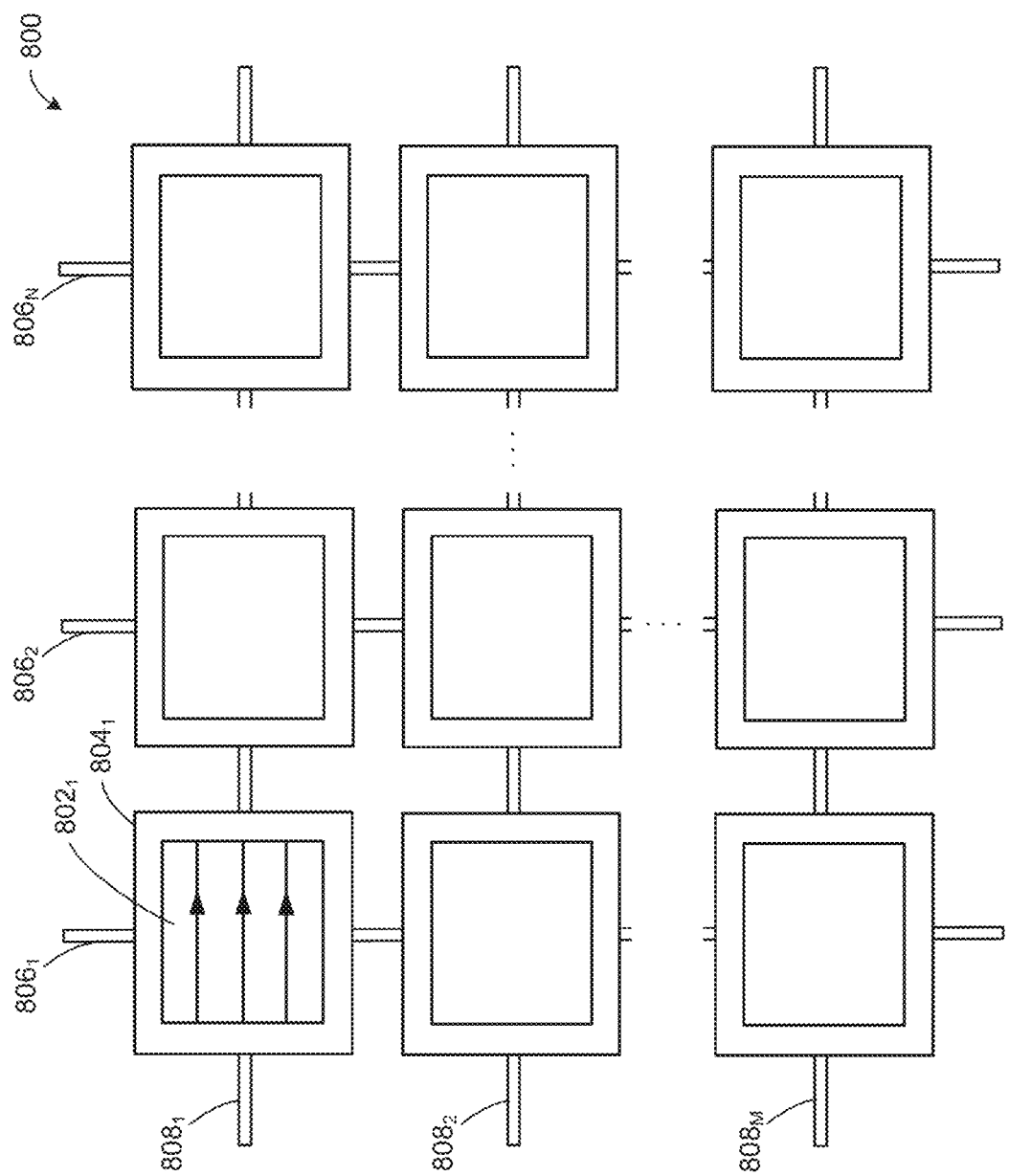
FIG. 8B is a schematic diagram illustrating a top-down view of the LC patterning control system shown in FIG. 8A, according to various embodiments.

As shown, the LC patterning control system 800 also includes wires $806_1$ to $806_N$ and $808_1$ to $808_M$ (collectively referred to as wires 806 and 808 and individually referred to as wire 806 and 808, respectively) that are disposed in a crossed-wire scheme below the LCs 802 and magnets 804. FIG. 8B is a schematic diagram illustrating a top-down view of the LC patterning control system 800 showing the cross-wire scheme. Similar to the wires 508 and 510 described above with respect to FIG. 5B, magnetic fields are generated by the flowing of current through the wires 806 and 808. For example, thin-film transistors could be used to drive currents through the wires 806 and 808, and two of the wires 806 and 808 may be driven at the same time to generate a coercive field needed to switch one of the magnets 804 between, e.g., different easy axes in the case of anisotropic magnets 804.

As shown in FIGS. 7A-7B, the switching of the magnet $804_1$, by driving current through both of the wires $806_1$ and $808_1$, produces a magnetic field that is in a particular direction in the plane. Anisotropic molecules of the LC $802_1$ may reorient to align with such a magnetic field, which may represent, e.g., an ON state of the pixel, while the molecules of other LCs 802 may be aligned in another direction (e.g., perpendicular to the plane) and represent an OFF state, or vice versa. Similar to the magnets 506 and LCs 502 described above with respect to FIG. 5B, the magnets 804 and associated LCs 802 may be rapidly switched at, e.g., 10-100 ns per switch in some embodiments. Further, when not being switched, magnetizations of the magnets 804 may remain fixed without power dissipation.

Although certain embodiments of reflective and transmissive LC patterning control systems are described above with respect to FIGS. 4-8 as reference examples, other embodiments in which magnetic fields are used to align LCs are also contemplated. For example, in some embodiments, the orientations of magnetic fields generated by magnets may differ from the examples disclosed herein. As another example, transparent magnetic oxides may be used in some transmissive embodiments in lieu of magnets that wrap around LCs.

Figure 9:
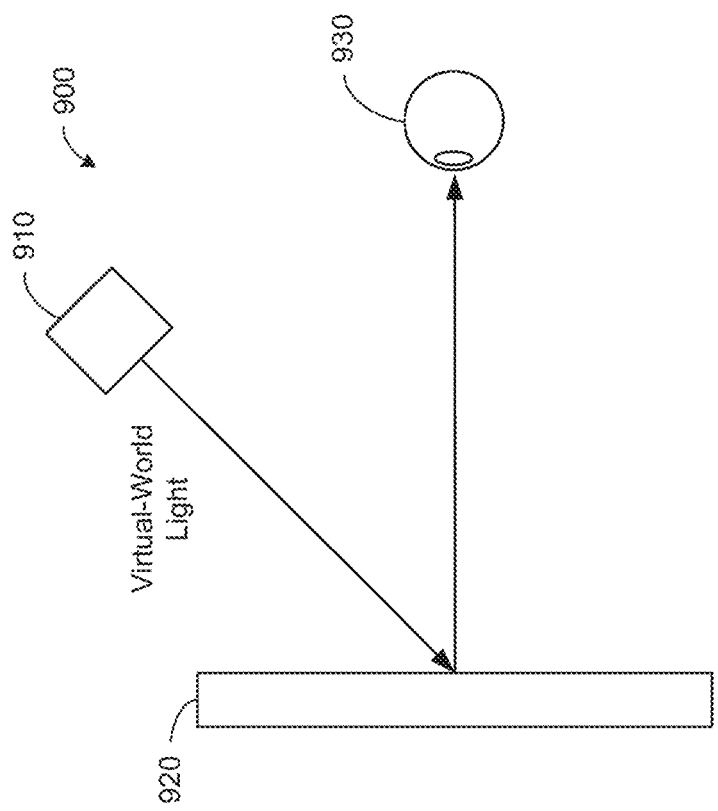
FIG. 9 is a schematic diagram illustrating a portion of a virtual reality optical system that includes a LC patterning control system, according to various embodiments.
Figure 10:
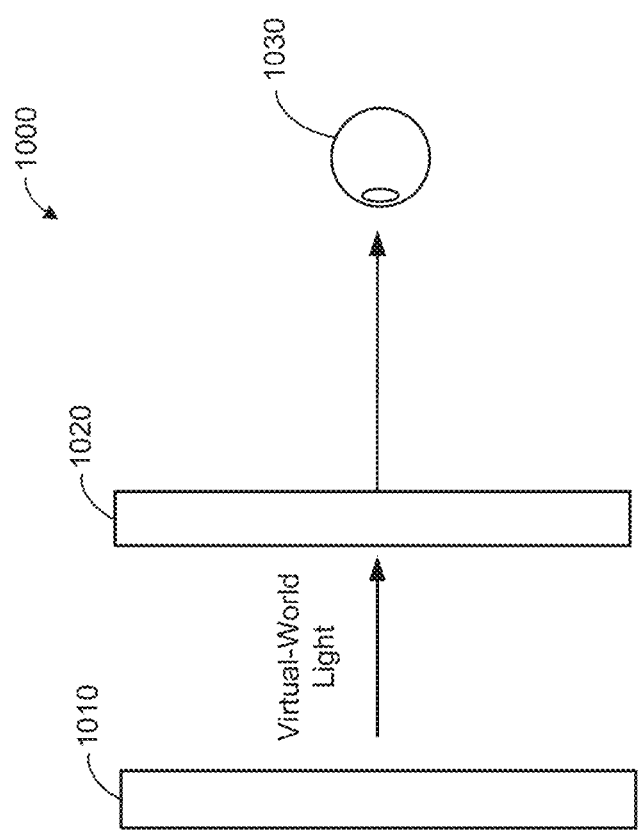
FIG. 10 is a schematic diagram illustrating a portion of another virtual reality optical system that includes a LC patterning control system, according to various embodiments.

FIGS. 9-10 illustrate example optical system configurations that include one or more LC patterning control systems, according to various embodiments. Such systems may be included in, for example, near-eye display devices for virtual reality (VR), augmented reality (AR), or mixed reality (MR), such as the such as the NED system 100 or the HMD 162 described above with respect to FIGS. 1A-1B and 2A-2B, respectively. Although particular optical systems are disclosed herein as reference examples, the LC patterning control systems disclosed herein may generally be included in any suitable optical systems. In various embodiments, an optical system for an AR, VR, and MR near-eye display device is configured to process virtual-world light, which is generated by a light source driven by an application (e.g., one of the applications stored in the application store 355 described above with respect to FIG. 3) executed by a computer processor. The optical system may process such virtual light to form an image at an exit pupil of the optical system, which may coincide with a location of an eye of a user of the NED device.

In various embodiments, an optical system for an AR and MR near-eye display device is configured to process real-world light. Unlike the case for virtual-world light, such an optical system need not introduce optical power to the image of the real-world light at the exit pupil and need not change the location of the exit pupil for the real-world light in response to a change in the location (and/or orientation) of the eye with respect to the optical system. Accordingly, real-world light and virtual-world light, though co-located in portions of the optical system, are, at least in some embodiments, processed differently from one another by the optical system.

FIG. 9 is a schematic diagram illustrating a portion of a virtual reality optical system 900 that includes a LC patterning control system, according to various embodiments. For example, the optical system 900 could be included in a virtual reality NED. As shown, the optical system 900 includes a light source 910 and a LC patterning control system 920.

The light source 910 is configured to project a beam of light onto the LC patterning control system 920. Examples of light sources include organic light emitting diodes (OLEDs), active-matrix organic light-emitting diodes (AMOLEDs), light emitting diodes (LEDs), lasers, superluminescent LED (SLED), or some combination thereof. Any technically feasible light source may be used, and the type of light source that is used will generally depend on the application. For example, a coherent light source, such as a laser or SLED, could be used to create holograms, while any light source, such as an LED, could be used for normal imaging. In some embodiments, the light source 910 may produce polarized light. In other embodiments, the LC patterning control system 920 may include one or more polarization layers that polarize light from the light source 910 that is incident thereon.

In some embodiments, the LC patterning control system 920 may be one of the reflective LC patterning control systems 500, 600, or 700 described above with respect to FIGS. 5A-5B, 6A-6B, and 7A-7B, respectively. For example, in some embodiments, the LC patterning control system 920 may be a spatial light modulator including pixels that are driven ON and OFF, thereby forming image(s) reflected toward a viewer. As another example, in some embodiments, the light source 910 may be a coherent light source, such as a laser, and the LC patterning control system 920 may modulate coherent light emitted by the light source 910 to form a hologram. As yet another example, in some embodiments, the LC patterning control system 920 may be used for pupil/beam steering. In such cases, the LC patterning control system 920 could include, e.g., a PBP that steers light toward a user's eye.

In some embodiments, the optical system 900 may include additional components that are not shown, such as a lens or other optical element(s) that focus light at an exit pupil 930 of the optical system 900, an eye tracking module to provide eye position information to a controller module, optical element(s) to steer the exit pupil 930 to different locations according to an eye gaze angle, etc. For example, a rift lens, PBP lens, pancake lens, etc. could be used to focus light at the exit pupil 930. As another example, an eye tracking module could be located at any of a number of locations within or on a NED. That is, embodiments may include any technically feasible configuration of a VR optical system that includes a LC patterning control system according to techniques disclosed herein.

FIG. 10 is a schematic diagram illustrating a portion of another virtual reality optical system 1000 that includes a LC patterning control system, according to various embodiments. For example, the optical system 1000 could be included in a virtual reality NED. As shown, the optical system 1000 includes a light source 1010 and a LC patterning control system 1020.

Similar to the light source 910 described above, the light source 1010 may include, e.g., an OLED, an AMOLED, a LED, a laser, a SLED, or some combination thereof that projects a beam of light onto the LC patterning control system 1020. Further, in some embodiments, the light source 1010 may produce polarized light or, alternatively, the LC patterning control system 1020 may include polarization layer(s) that polarize light from the light source 1010.

In contrast to the LC patterning control system 920, the LC patterning control system 1020 transmits light incident thereon from the light source 1010. In some embodiments, the LC patterning control system 1020 may be the LC patterning control system 800 described above with respect to FIGS. 8A-8B. For example, in some embodiments, the LC patterning control system 1020 may be a spatial light modulator including pixels that are driven ON and OFF, thereby forming image(s). As another example, in some embodiments, the LC patterning control system 1020 may modulate coherent light emitted by the light source 1010 to form a hologram. As yet another example, in some embodiments, the LC patterning control system 1020 may be a PBP optical element, such as a PBP lens or grating, whose functionalities are discussed in greater detail below with respect to FIGS. 12A-12B. As a further example, in some embodiments, the LC patterning control system 1020 may be a varifocal lens that has a continuous range of adjustment of optical power enabled by aligning LCs with locally applied magnetic fields.

Similar to the discussion above with respect to the optical system 900, the optical system 1000 may include additional components that are not shown, such as a lens or other optical element(s) that focus light at an exit pupil 1030 of the optical system 1000, an eye tracking module to provide eye position information to a controller module, optical element(s) to steer the exit pupil 1030 to different locations according to an eye gaze angle, etc.

Figure 11:
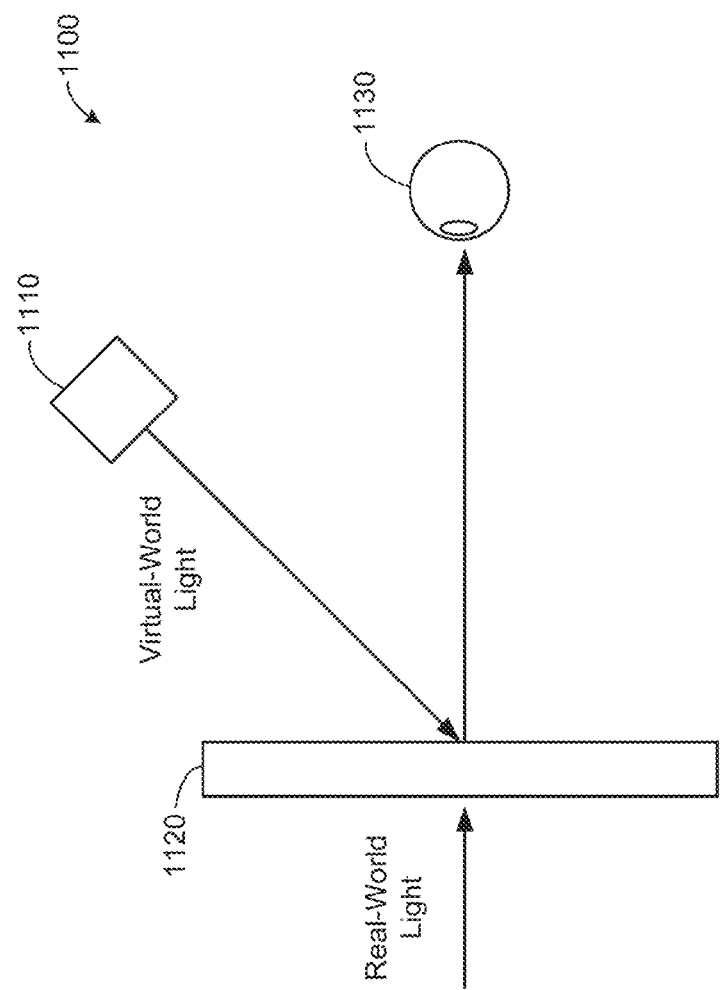
FIG. 11 is a schematic diagram illustrating a portion of an augmented reality optical system that includes a LC patterning control system, according to various embodiments.

FIG. 11 is a schematic diagram illustrating a portion of an augmented reality optical system 1100 that includes a LC patterning control system, according to various embodiments. For example, the optical system 1100 may be included in an augmented reality NED. The optical system 1100 is different from the optical systems 900 and 1000 in a number of ways. For example, the optical systems 900 and 1000 are configured to operate with virtual-world light, whereas the optical system 1100 is configured to operate with virtual-world light and real-world light.

As shown, the optical system 1100 includes a light source 1110 and a LC patterning control system 1120. Similar to the light source 910 described above, the light source 1110 may include, e.g., an OLED, an AMOLED, a LED, a laser, a SLED, or some combination thereof that projects a beam of light onto the LC patterning control system 1120. Further, in some embodiments, the light source 1110 may produce polarized light or, alternatively, the LC patterning control system 1120 may include polarization layer(s) that polarize light from the light source 1110.

Illustratively, the LC patterning control system 1120 works in a reflective mode that is transparent to real-world light and combines the real-world light with a virtual image generated using the light source 1110. For example, in some embodiments, the LC patterning control system 1120 may be the LC patterning control system 800 described above with respect to FIG. 8. Similar to the discussion above with respect to the LC patterning control system 1020, the LC patterning control system 1120 may be, e.g., a spatial light modulator, a PBP optical element, a varifocal lens, or used in holography, among other things, in some embodiments.

In some embodiments, the optical system 1100 may further include a prism, waveguide optical system, or other optical element(s) that redirect and/or focus light from the light source 1110 to the exit pupil position 1130. In such cases, a LC patterning control system may (or may not) be located differently in the optical system than the LC patterning control system 1120 shown in FIG. 11. In some embodiments, the optical system 1100 may also include other components that are not shown, such as a lens or other optical element(s) that focus light at an exit pupil 1130 of the optical system 1100, an eye tracking module to provide eye position information to a controller module, optical element(s) to steer the exit pupil 1130 to different locations according to an eye gaze angle, etc. That is, embodiments may include any technically feasible configuration of an AR optical system that includes a LC patterning control system according to techniques disclosed herein.

Figure 12A:
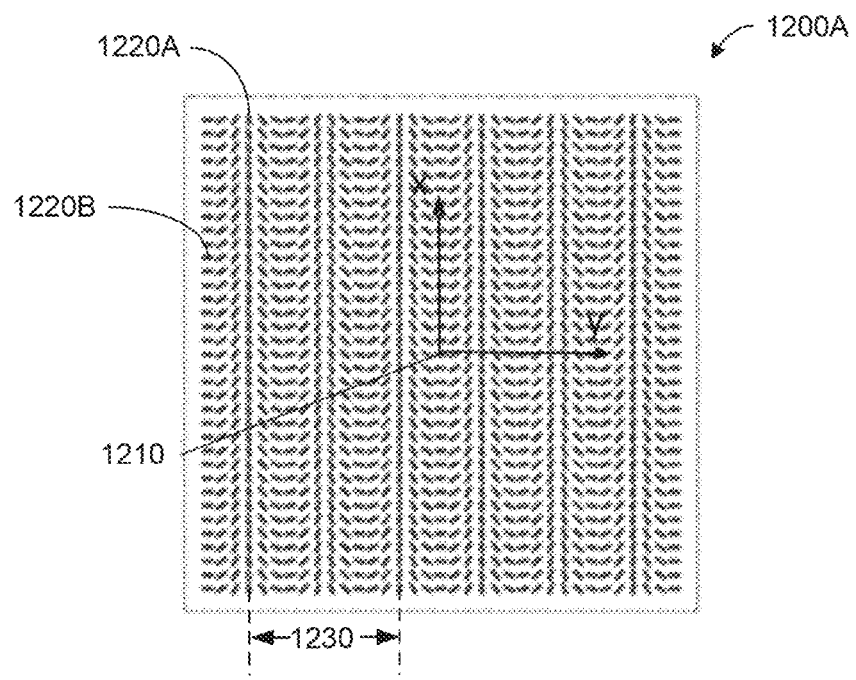
FIG. 12A illustrates a Pancharatnam-Berry phase (PBP) grating, according to various embodiments.

FIG. 12A illustrates a PBP grating 1200A, according to various embodiments. Mutually orthogonal x and y-axes 1210 are illustrated for reference. The z-axis, not illustrated, is perpendicular to the x-y plane and along an optical axis of the grating 1200A.

As shown, the grating 1200A includes uniaxial fast axis 1220 of LC or meta structure that are oriented in a linearly repetitive pattern. In FIG. 12A, the orientation of the fast axis are illustrated as short line segments aligned so as to schematically represent orientations of the LCs or the meta structure. For example, the fast axis 1220A is oriented in the x-direction while LC 1220B is oriented in the y-direction. A fast axis between 1220A and 1220B are aligned along directions intermediate to the x and y-directions. The uniaxial waveplate having such a patterned orientation gives rise to a geometric-phase shift of light as a consequence of polarization evolution as light waves of the light propagate through the waveplate (e.g., phase plate). In various embodiments, orientations of the fast axis along the x-axis are constant for a particular x-y plane of the grating 1200A. Further, though not illustrated, in various embodiments, orientations of the fast axis in a direction perpendicular to the x-y plane (the z-axis) may vary in a rotational fashion (e.g., a twisted structure).

The linearly repetitive pattern of the grating 1200A has a pitch that is half the distance 1230 along the y-axis between repeated portions of the pattern. The pitch determines, in part, the optical properties of the grating 1200A. For example, polarized light incident along the optical axis on the grating 1200A results in a grating output comprising primary, conjugate, and leakage light respectively corresponding to diffraction orders m=+1, −1, and zero. Although m=+1 is herein considered to be the primary order and the conjugate order is considered to be the m=−1 order, the designation of the orders could be reversed or otherwise changed. The pitch determines the diffraction angles (e.g., beam-steering angles) of the light in the different diffraction orders. Generally, the smaller the pitch, the larger the angles for a given wavelength of light.

Figure 12B:
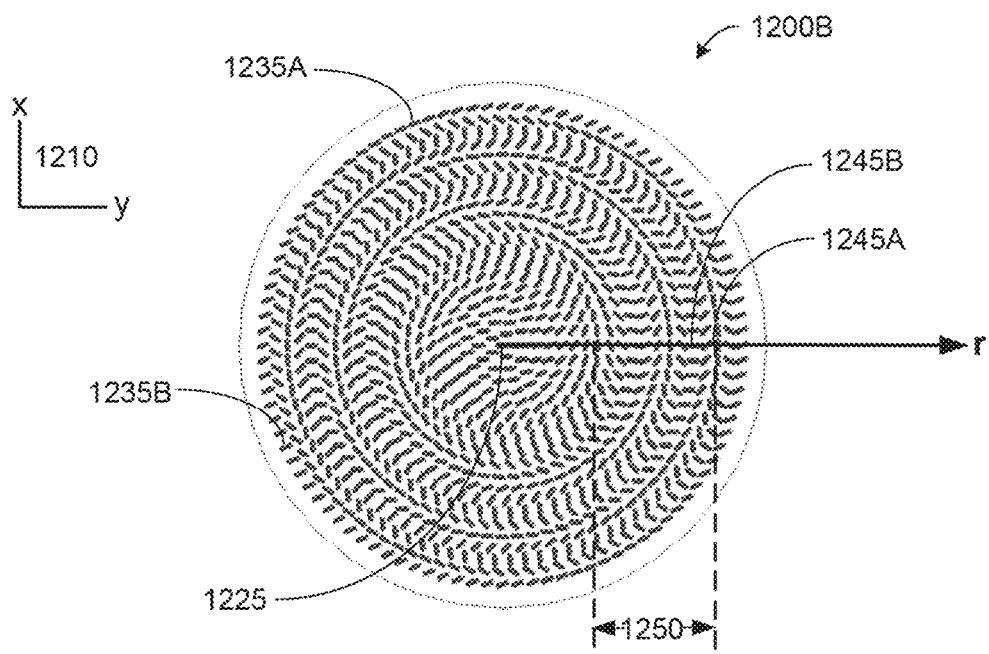
FIG. 12B is a top-down view of an example PBP lens, according to various embodiments.

FIG. 12B is a top-down view of an example PBP lens 1200B, according to various embodiments. Mutually orthogonal x and y-axes 1210 are illustrated for reference. The z-axis, not illustrated, is perpendicular to the x-y plane and along an optical axis of lens 1200B. An r-axis, in the x-y plane, represents a radial direction and distance from the center 1225 of lens 1200B.

As shown, the PBP lens 1200B includes fast axis 1235 that is oriented in a radially and circumferentially repetitive pattern. As shown, the LCs or the meta structures are illustrated as short line segments aligned so as to schematically represent orientations of the fast axis. For example, for a fixed distance from the optical axis, the fast axis 1235A is oriented in a circumferential direction while the fast axis 1235B is oriented in a radial direction. Fast axes between 1235A and 1235B are aligned along directions intermediate to circumferential and radial directions. As another example, along a fixed radial direction, a fast axis 1245A is oriented in a circumferential direction while a fast axis 1245B is oriented in a radial direction. Fast axes between 1245A and 1245B are aligned along directions intermediate to circumferential and radial directions. The uniaxial fast axes of the LCs or meta structures having such a patterned orientation give rise to a geometric-phase shift of light as a consequence of polarization evolution as light waves of the light propagate through the geometric phase plate. Though not illustrated, orientations of the fast axis in a direction perpendicular to the x-y plane (the z-axis) may vary in a rotational fashion (e.g., a twisted structure).

The radially repetitive pattern of the lens 1200B has a pitch 1250, which is the distance along the r-axis between repeated portions of the pattern. Generally, the pitch 1250 may vary in a radial direction. For example, the distance along the r-axis between repeated portions of the pattern may decrease as r increases. As a result, the pitch 1250 may be larger closer toward the center 1225. The pitch determines, in part, the optical properties of the lens 1200B. For example, polarized light incident along the optical axis on the lens 1200B results in a lens output of light having a particular focal length for a particular wavelength of light. The pitch determines such a focal length. Generally, the smaller the pitch, the smaller the focal length for a given wavelength of light.

Classically, a wavefront of light is controlled by adjusting optical path length (OPL), defined for an isotropic material as the product of the speed of the wave (dependent on the material's refractive index) and the physical propagation distance of the wave through the material. For a classical lens, the spatially varying OPL caused by a curved surface of a lens results in a phase shift of the wavefront giving rise to a focal length of the lens. A geometric-phase shift of a PBP lens, in contrast, arises from the evolution of lightwaves through the anisotropic volume of the PBP lens. The phase shift depends on the geometry of the pathway of the individual lightwaves through the anisotropy, which transforms the lightwaves. For example, molecular anisotropy of LCs and nanostructures of meta materials in the PBP lens lead to a phase shift of transmitted or reflected lightwaves. Such a phase shift is directly proportional to the orientation of an effective optic axis and the fast axis orientation of the anisotropic material.

In some embodiments, PBP lenses, such as the PBP lens 1200B may be active (also referred to as an "active element") or passive (also referred to as a "passive element"). An active PBP lens, for example, has three optical states: an additive state, a neutral state, and a subtractive state. The additive state adds optical power to the system, the neutral state does not affect the optical power of the system and does not affect the polarization of light passing through the active PBP lens, and the subtractive state subtracts optical power from the system.

The state of an active PBP lens may be determined by the handedness of polarization of light incident on the active PBP lens and a measure of a magnetic field applied to the active PBP lens made of liquid crystal. For example, in some embodiments, an active PBP LC lens operates in a subtractive state responsive to incident light with a right-handed circular polarization and an applied magnetic field of zero (or more generally, below a threshold magnetic field). In some embodiments, an active PBP LC lens operates in an additive state responsive to incident light with a left-handed circular polarization, and an applied magnetic field of zero. In some embodiments, an active PBP LC lens operates in a neutral state (regardless of polarization) responsive to an applied magnetic field. The applied magnetic field aligns LCs with a positive dielectric anisotropy along an applied magnetic field direction. If the active PBP LC lens is in the additive or subtractive state, then light output from the active PBP LC lens has a handedness that is opposite of the handedness of light input into the active PBP LC lens. In contrast, if the active PBP LC lens is in the neutral state, then light output from the active PBP LC lens has the same handedness as the light input into the active PBP LC lens.

A passive PBP lens has two optical states: an additive state and a subtractive state. The state of a passive PBP lens is determined by the handedness of polarization of light incident on the passive PBP lens. In general, the passive PBP lens outputs light that has a handedness that is opposite of the light input into the passive PBP lens. For example, in some embodiments, a passive PBP lens operates in a subtractive state responsive to incident light with a right handed polarization and operates in an additive state responsive to incident light with a left handed polarization.

In some embodiments, a PBP grating, such as 1200B, may be active (also referred to as an "active element") or passive (also referred to as a "passive element"). An active PBP grating, for example, has three optical states, similar to that of an active PBP lens: an additive state, a neutral state, and a subtractive state. In an additive state, the active PBP grating diffracts light of a particular wavelength to an angle that is positive relative to the diffraction angle of the subtractive state. In the subtractive state, the active PBP grating diffracts light at a particular wavelength to an angle that is negative relative to the positive angle of the additive state. On the other hand, in the neutral state, the PBP grating does not lead to a diffraction of light and does not affect the polarization of light passing through the active PBP grating.

The state of an active PBP grating may be determined by a handedness of polarization of light incident on the active PBP grating and a measure of the magnetic field applied to the active PBP grating. For example, in some embodiments, an active PBP grating operates in a subtractive state responsive to incident light with a right-handed circular polarization and an applied magnetic field of zero (or, more generally, below a threshold magnetic field). In some embodiments, the PBP grating operates in an additive state responsive to incident light with a left-handed circular polarization and an applied magnetic field of zero. In some embodiments, the PBP grating operates in a neutral state (regardless of polarization) responsive to an applied magnetic field. Liquid crystals with positive dielectric anisotropy may be aligned along an applied magnetic field direction. If the active PBP grating is in the additive or subtractive state, then light output from the active PBP grating has a handedness that is opposite the handedness of light input into the active PBP grating. If the active PBP grating is in the neutral state, then light output from the active PBP grating has the same handedness as the light input into the active PBP grating.

The state of a passive PBP grating is determined by a handedness of polarization of light incident on the passive PBP grating. For example, in some embodiments, a passive PBP grating operates in a subtractive state responsive to incident light with a right-handed circular polarization. In some embodiments, the passive PBP grating operates in an additive state responsive to incident light with a left-handed circular polarization. For the passive PBP grating in the additive or subtractive state, light output from the passive PBP grating has a handedness that is opposite the handedness of light input into the passive PBP grating.

Figure 13:
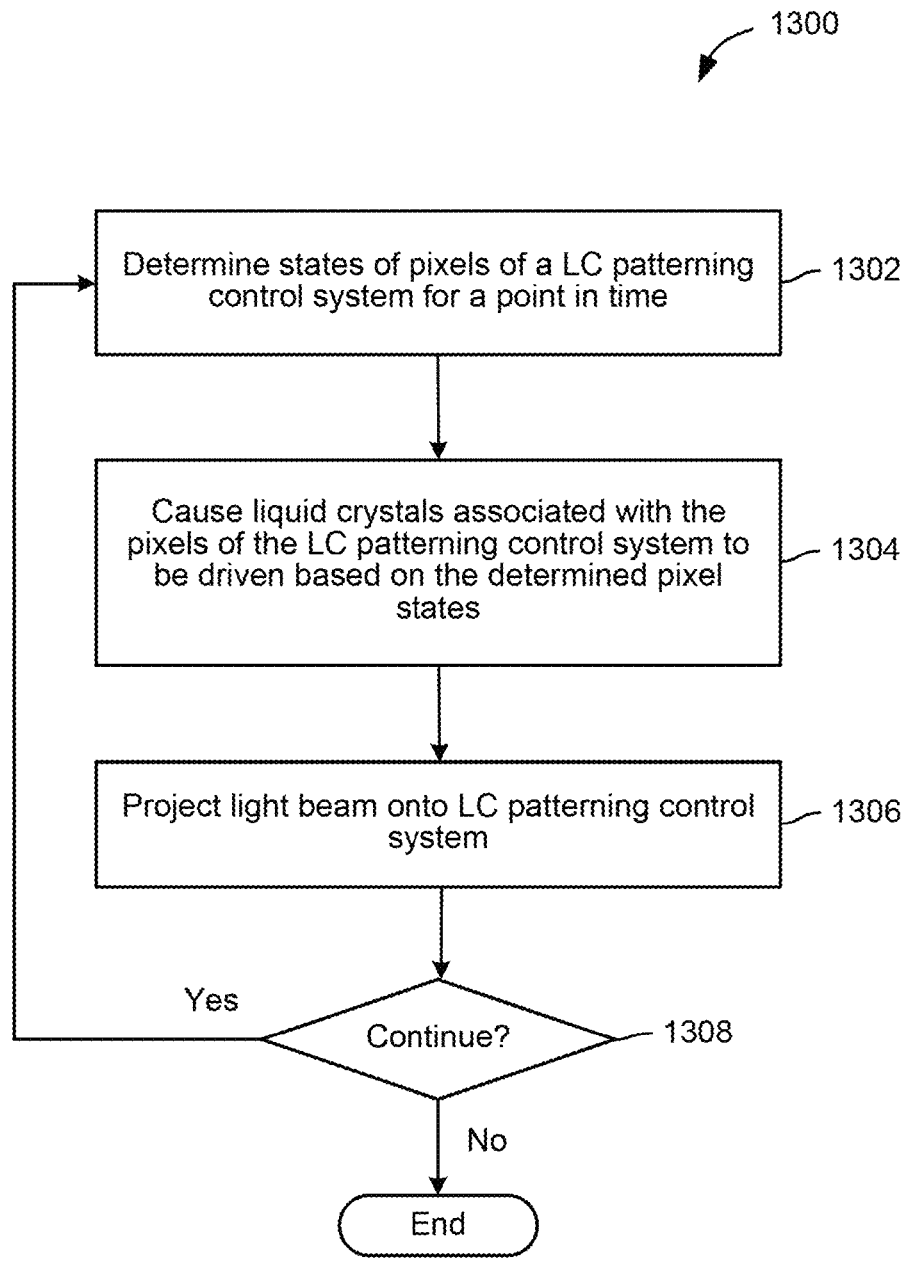
FIG. 13 is a flow diagram illustrating a method for modulating a beam of light, according to various embodiments.

FIG. 13 is a flow diagram illustrating a method for modulating a beam of light, according to various embodiments. Although the method steps are described with reference to the systems of FIGS. 1-12, persons skilled in the art will understand that any system may be configured to implement the method steps, in any order, in other embodiments.

As shown, a method 1300 begins at step 1302, where an application determines the states of pixels of a LC patterning control system for a point in time. The application may be, e.g., one of the applications stored in the application store 355, which as described above with respect to FIG. 3 may include gaming applications, conferencing applications, video playback applications, or any other suitable applications. In some embodiments, the application may determine pixels of a LC patterning control system to turn ON and OFF at step 1302. Although discussed herein primarily with respect to such systems, the application may also determine in-between states in some embodiments. That is, depending on the magnetic field drive system, some or all of the intermediate states may be achievable in the LC patterning control system.

The pixel states determined by the application at step 1302 may generally depend on the dynamic optics application. For example, the application may determine which pixels of a spatial light modulator need to be turned ON or OFF in order to form an image. As another example, the application may solve holography equations in order to determine pixel states needed to generate a hologram from light emitted by a coherent light source. Other pixel states may be determined for other dynamic optics application.

At step 1304, the application causes liquid crystals associated with the pixels of the LC patterning control system to be driven using magnetic fields, based on the determined pixel states. Doing so may reorient the anisotropic molecules of LCs that are associated with pixels to align with magnetic fields produced by corresponding magnets. For example, the controller could cause currents to be driven through appropriate wires to switch magnets in the LC patterning control systems 500, 600, and 800, as described above with respect to FIGS. 5B, 6B, and 8B, respectively. As another example, the controller could apply voltages to drive currents through the coils of magnets to be switched in the LC patterning control system 700, as described above with respect to FIG. 7B.

At step 1306, the application causes a light beam to be projected onto the LC patterning control system. The LC patterning control system imposes a spatially varying modulation on such a light beam. Due to birefringence, the phase of light passing through LCs will be modulated differently for pixels having different states. As a result, the LC patterning control system may, e.g., form an image, form a hologram from coherent light, etc., as described above. In some embodiments, the LC patterning control system may reflect the modulated light, such as in the LC patterning control systems 500, 600, and 700 described above with respect FIGS. 5A-5B, 6A-6B, and 7A-7B, respectively. In other embodiments, the LC patterning control system may transmit the modulated light, such as in the LC patterning control system 800 described above with respect to FIGS. 8A-8B.

At step 1308, the application determines whether to continue to another point in time. If the application determines to continue, then the method 1300 returns to step 1302, where the application determines the states of pixels of the LC patterning control system for a next point in time. On the other hand, if the application determines not to continue, then the method 1300 ends.

One advantage of the LC patterning control systems disclosed herein is that the use of magnetic, rather than electric, fields to align LCs permits pixel sizes to be reduced to below the limit of traditional LC devices. For example, the pixel sizes of embodiments may be smaller than ~1 μm, such as ~100 nm. The LC patterning control systems disclosed herein are also not affected by ionic shielding. In addition, the magnetization of anisotropic magnets may be fixed after such magnets are switched, allowing LCs to remain aligned with magnetic fields produced by those magnets without power dissipation. These technical advantages represent one or more technological advancements over prior art approaches.

1. Some embodiments include a liquid crystal patterning control system, comprising a plurality of pixels, each of the pixels comprising a liquid crystal and a magnet, wherein, responsive to a switching of the magnet, molecules of the liquid crystal reorient to substantially align with a magnetic field generated by the magnet.

2. The liquid crystal patterning control system of clause 1, further comprising a reflective layer disposed between the liquid crystal and the magnet included in each of the pixels, wherein the reflective layer is configured to reflect light that is incident on the liquid crystal patterning control system and modulated by the liquid crystals included in the pixels.

3. The liquid crystal patterning control system of any of clauses 1-2, wherein the magnet included in each of the pixels comprises a microparticle, a nanoparticle, or a plurality of magnetic domains.

4. The liquid crystal patterning control system of any of clauses 1-3, further comprising a plurality of wires disposed in a cross-wire configuration below the magnets included in the pixels, wherein each of the magnets included in the pixels is switched by driving current through corresponding wires.

5. The liquid crystal patterning control system of any of clauses 1-4, wherein the magnet included in each of the pixels comprises a different microcoil or nanocoil wrapped around a high permeability core, and each microcoil or nanocoil included in the pixels is connected to a corresponding voltage source and a common ground.

6. The liquid crystal patterning control system of any of clauses 1-5, wherein the magnet included in each of the pixels is wrapped around the liquid crystal included in the pixel.

7. The liquid crystal patterning control system of any of clauses 1-6, wherein each of the pixels further comprises at least one alignment layer disposed adjacent to the liquid crystal included in the pixel, and the at least one alignment layer included in each of the pixels substantially aligns molecules of the liquid crystal included in the pixel prior to switching of the magnet associated with the liquid crystal.

8. The liquid crystal patterning control system of any of clauses 1-7, wherein the liquid crystal patterning control system includes one of a spatial light modulator, a Pancharatnam-Berry phase lens, a liquid crystal display screen, or a varifocal lens.

9. The liquid crystal patterning control system of any of clauses 1-8, wherein the liquid crystal patterning control system is used in computer-generated holography.

10. The liquid crystal patterning control system of any of clauses 1-9, wherein the liquid crystal patterning control system is included in a near eye display device.

11. Some embodiments include a cell, comprising a birefringent material, and at least one alignment layer disposed adjacent to the birefringent material, wherein an reorientation of molecules in the birefringent material is driven by a magnet.

12. The cell of clause 11, wherein a reflective layer is disposed between the birefringent material and the magnet.

13. The cell of any of clauses 11-12, further comprising at least one of a glass substrate layer or a polarization layer.

14. The cell of any of clauses 11-13, wherein the birefringent material comprises liquid crystal molecules in a planar or homeotropic alignment, and responsive to a switching of the magnet, the liquid crystal molecules included in the birefringent material reorient to substantially align with a magnetic field generated by the magnet.

15. The cell of any of clauses 11-14, wherein the magnet comprises a microparticle, a nanoparticle, a plurality of magnetic domains, or microcoil or nanocoil wrapped around a high permeability core.

16. The cell of any of clauses 11-15, wherein the magnet is wrapped around the birefringent material.

17. Some embodiments include a computer-implemented method for modulating light, the method comprising determining states of a plurality of pixels for at least one point in time, driving liquid crystals associated with the pixels using magnetic fields, based on the determined states of the pixels, and projecting light that passes through the liquid crystals.

18. The method of clause 17, further comprising, reflecting the light that passes through the liquid crystals.

19. The method of any of clauses 17-18, wherein driving the liquid crystals comprises either causing currents to be driven through wires that intersect at magnets associated with the liquid crystals or applying voltages to the magnets associated with the liquid crystals.

20. The method of any of clauses 17-19, wherein the light is associated with an artificial reality application.

Any and all combinations of any of the claim elements recited in any of the claims and/or any elements described in this application, in any fashion, fall within the contemplated scope of the present disclosure and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations is apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A liquid crystal patterning control system, comprising:
a plurality of pixels, each of the pixels comprising:
a liquid crystal, and
a magnet,
wherein, responsive to a switching of the magnet, molecules of the liquid crystal reorient to substantially align with a magnetic field generated by the magnet, and
wherein the magnet is switchable between a plurality of preferred magnetization directions or a plurality of magnetic domains, wherein each of the plurality of preferred magnetization directions or the plurality magnetic domains corresponds to a different state of the pixel.

2. The liquid crystal patterning control system of claim 1, further comprising:
a reflective layer disposed between the liquid crystal and the magnet included in each of the pixels,
wherein the reflective layer is configured to reflect light that is incident on the liquid crystal patterning control system and modulated by the liquid crystals included in the pixels.

3. The liquid crystal patterning control system of claim 1, wherein the magnet included in each of the pixels comprises a microparticle or a nanoparticle.

4. The liquid crystal patterning control system of claim 3, further comprising:
a plurality of wires disposed in a cross-wire configuration below the magnets included in the pixels,
wherein each of the magnets included in the pixels is switched by driving current through corresponding wires.

5. The liquid crystal patterning control system of claim 1, wherein:
the magnet included in each of the pixels comprises a different microcoil or nanocoil wrapped around a high permeability core; and
each microcoil or nanocoil included in the pixels is connected to a corresponding voltage source and a common ground.

6. The liquid crystal patterning control system of claim 1, wherein:
each of the pixels further comprises at least one alignment layer disposed adjacent to the liquid crystal included in the pixel; and
the at least one alignment layer included in each of the pixels substantially aligns molecules of the liquid crystal included in the pixel prior to switching of the magnet associated with the liquid crystal.

7. The liquid crystal patterning control system of claim 1, wherein the liquid crystal patterning control system includes one of a spatial light modulator, a Pancharatnam-Berry phase lens, a liquid crystal display screen, or a varifocal lens.

8. The liquid crystal patterning control system of claim 1, wherein the liquid crystal patterning control system is used in computer-generated holography.

9. The liquid crystal patterning control system of claim 1, wherein the liquid crystal patterning control system is included in a near eye display device.

10. A cell, comprising:
a birefringent material; and
at least one alignment layer disposed adjacent to the birefringent material,
wherein a reorientation of molecules in the birefringent material is driven by a magnet, and
wherein the magnet is switchable between a plurality of preferred magnetization directions or a plurality of magnetic domains.

11. The cell of claim 10, further comprising a reflective layer that is disposed between the birefringent material and the magnet.

12. The cell of claim 10, further comprising at least one of a glass substrate layer or a polarization layer.

13. The cell of claim 10, wherein:
the birefringent material comprises liquid crystal molecules in a planar or homeotropic alignment; and
responsive to a switching of the magnet, the liquid crystal molecules included in the birefringent material reorient to substantially align with a magnetic field generated by the magnet.

14. The cell of claim 10, wherein the magnet comprises a microparticle, a nanoparticle, or a microcoil or a nanocoil wrapped around a high permeability core.

15. A computer-implemented method for modulating light, the method comprising:
determining states of a plurality of pixels for at least one point in time;
driving, based on the determined states of the pixels, liquid crystals associated with the pixels using magnets associated with the liquid crystals, wherein each magnet associated with one of the liquid crystals is switchable between a plurality of preferred magnetization directions or a plurality of magnetic domains; and
projecting light that passes through the liquid crystals.

16. The method of claim 15, further comprising, reflecting the light that passes through the liquid crystals.

17. The method of claim 15, wherein driving the liquid crystals comprises either causing currents to be driven through wires that intersect at magnets associated with the liquid crystals or applying voltages to the magnets associated with the liquid crystals.

18. The method of claim 15, wherein the light is associated with an artificial reality application.

* * * * *